US012627621B2

(12) United States Patent
Kim et al.

(10) Patent No.: US 12,627,621 B2
(45) Date of Patent: May 12, 2026

(54) COMMUNICATION SYSTEM USING USER INTERFACES FOR DYNAMIC MODIFICATION OF CHAT COMMUNICATION ELEMENTS OF INSTANT MESSENGER

(71) Applicant: KAKAO CORP., Jeju-Si (KR)

(72) Inventors: Yong Yeon Kim, Seongnam-Si (KR); Min Yoo, Seongnam-Si (KR); Hyun Seok Yoo, Seongnam-Si (KR)

(73) Assignee: KAKAO CORP., Jeju-Si (KR)

( * ) Notice: Subject to any disclaimer, the term of this patent is extended or adjusted under 35 U.S.C. 154(b) by 0 days.

(21) Appl. No.: 18/530,897

(22) Filed: Dec. 6, 2023

(65) Prior Publication Data

US 2024/0187360 A1     Jun. 6, 2024

(30) Foreign Application Priority Data

Dec. 6, 2022    (KR) ........................ 10-2022-0169000

(51) Int. Cl.
*G06F 15/16*        (2006.01)
*H04L 51/04*        (2022.01)
(Continued)

(52) U.S. Cl.
CPC .............. *H04L 51/04* (2013.01); *H04L 51/10* (2013.01); *H04L 51/212* (2022.05)

(58) Field of Classification Search
CPC ....... H04L 51/04; H04L 51/10; H04L 51/212; H04L 51/046; H04L 51/18; G06Q 50/50
See application file for complete search history.

(56) References Cited

U.S. PATENT DOCUMENTS

| | | | | |
|---|---|---|---|---|
| 2006/0041848 A1* | 2/2006 | Lira | .................... | G06Q 10/107 |
| | | | | 715/805 |
| 2014/0047358 A1* | 2/2014 | Park | ........................ | H04L 51/04 |
| | | | | 715/758 |

(Continued)

FOREIGN PATENT DOCUMENTS

| | | |
|---|---|---|
| KR | 100784263 B1 | 12/2007 |
| KR | 10-2009-0118984 A | 11/2009 |
| KR | 10-2016-0132709 A | 11/2016 |

OTHER PUBLICATIONS (KR) Mar. 5, 2025, Office Action, App 10-2022-0169000, with English translation, 13 pages.

*Primary Examiner* — John B Walsh
(74) *Attorney, Agent, or Firm* — Banner & Witcoff, Ltd.

(57) ABSTRACT

A communication system using user interfaces for executing the instant messenger is provided. The system displays, in a user interface of an instant messenger application, a chat-room comprising a plurality of chat messages, receive, via the user interface, a first user input indicating a user selection of a chat section comprising one or more chat messages of the plurality of chat messages, receive, via the user interface, a second user input comprising an indication of one or more modifications to the chat section, wherein the one or more modifications comprise a modification to an output method of the chat section, generate a chat clip by generating, based on the modification to the output method, a modified version of the chat section, display, in the user interface, the chat clip, and cause a second computing device to display, in a second user interface of an instant messenger application, the chat clip.

20 Claims, 25 Drawing Sheets

(51) Int. Cl.
    H04L 51/10     (2022.01)
    H04L 51/212     (2022.01)

(56) References Cited

U.S. PATENT DOCUMENTS

| 2018/0192260 A1* | 7/2018 | Lee | ........................ | H04W 4/12 |
| 2020/0286161 A1* | 9/2020 | Marguello | ......... | G06Q 30/0639 |

\* cited by examiner

Figure 3C:
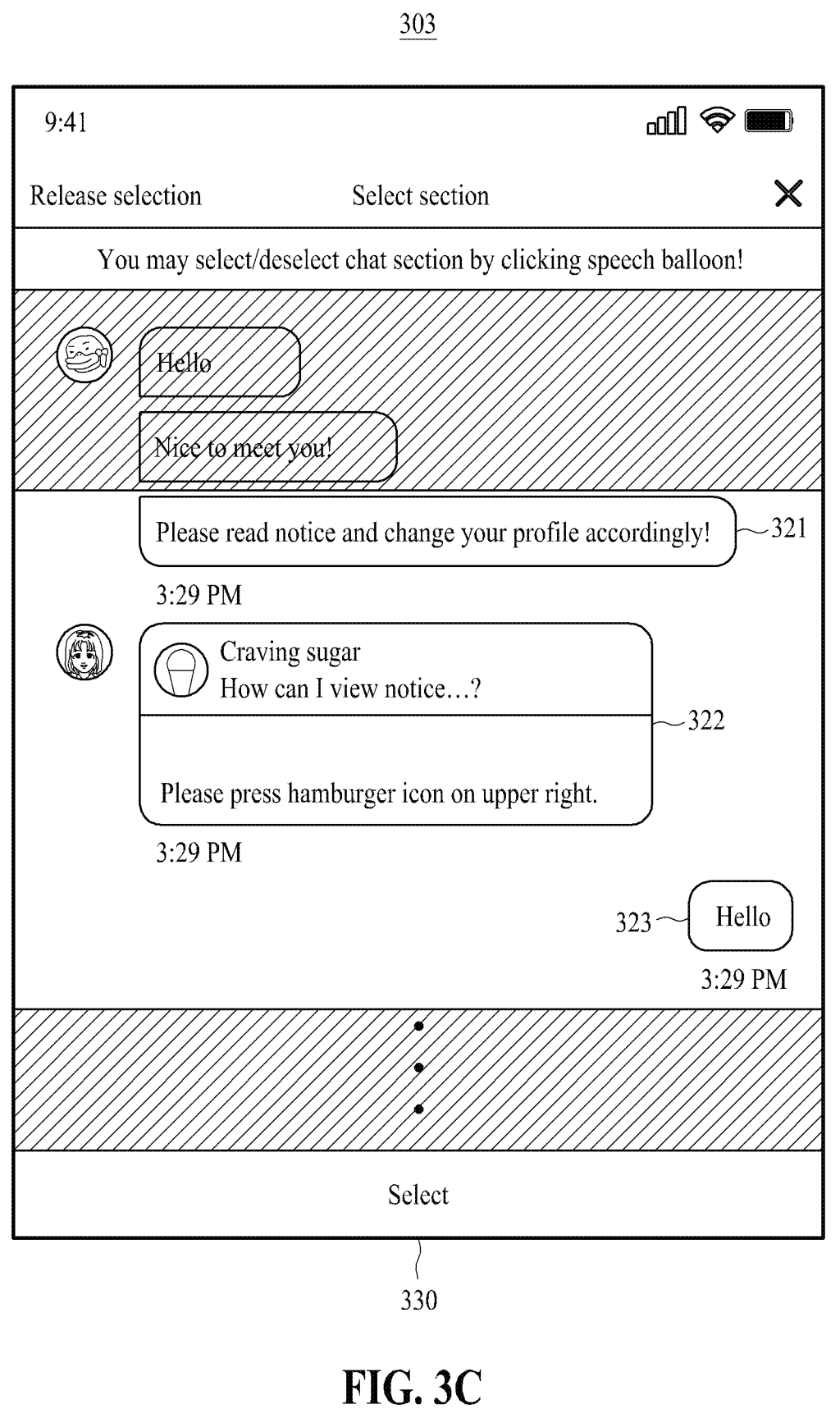

Release selection     Select section     ✕

You may select/deselect chat section by clicking speech balloon!

Hello

Nice to meet you!

Please read notice and change your profile accordingly! ~321

3:29 PM

Craving sugar
How can I view notice…? ~322

Please press hamburger icon on upper right.

3:29 PM

323~ Hello

3:29 PM

Select

Figure 9A:
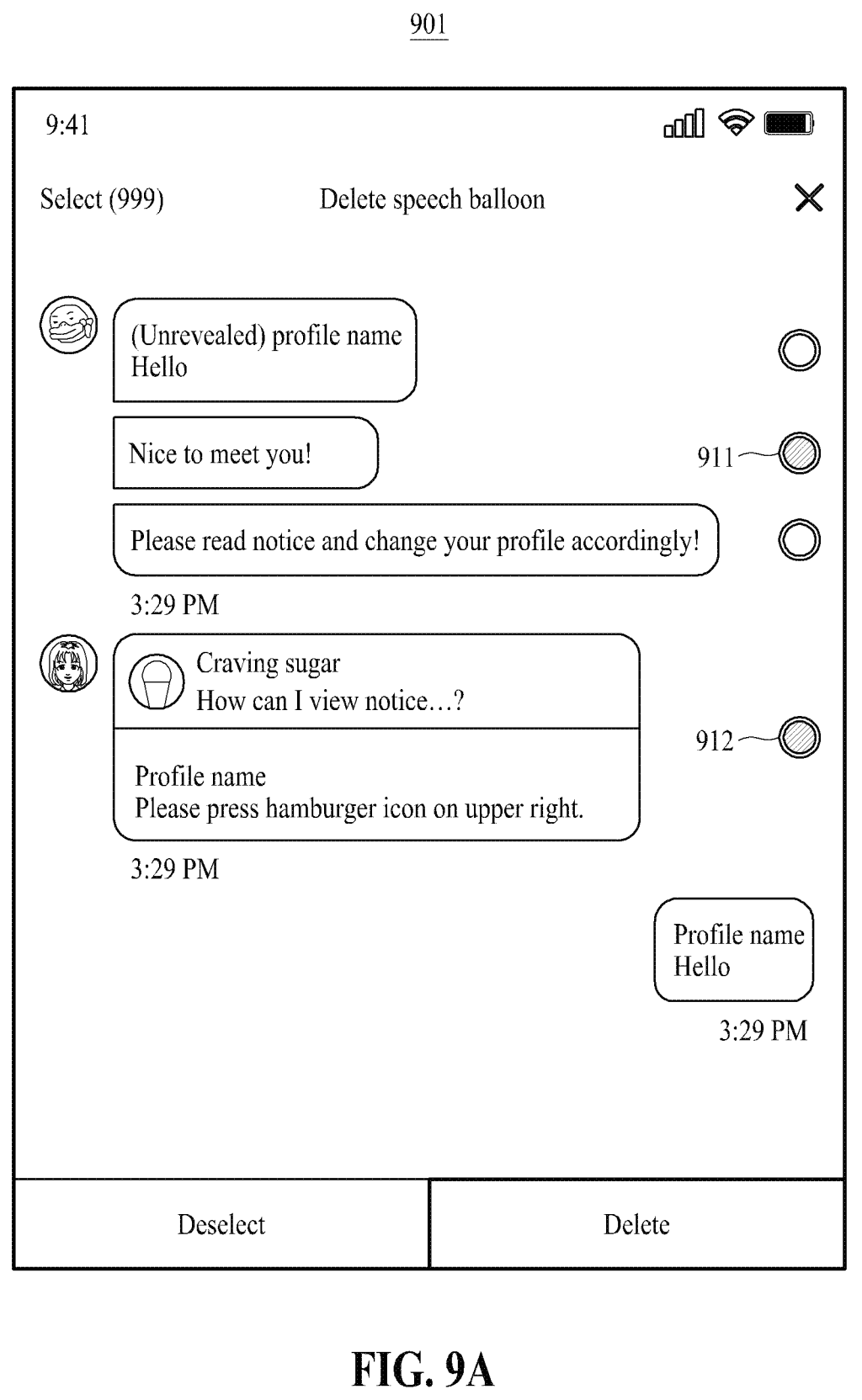

Select (999)               Delete speech balloon                    ✕

(Unrevealed) profile name
Hello                                                                    ◯

Nice to meet you!                                              911 ⌒ ◉

Please read notice and change your profile accordingly!          ◯

3:29 PM

Craving sugar
How can I view notice...?

912 ⌒ ◉
Profile name
Please press hamburger icon on upper right.

3:29 PM

Profile name
                                                    Hello

3:29 PM

Deselect                              Delete

Figure 9B:
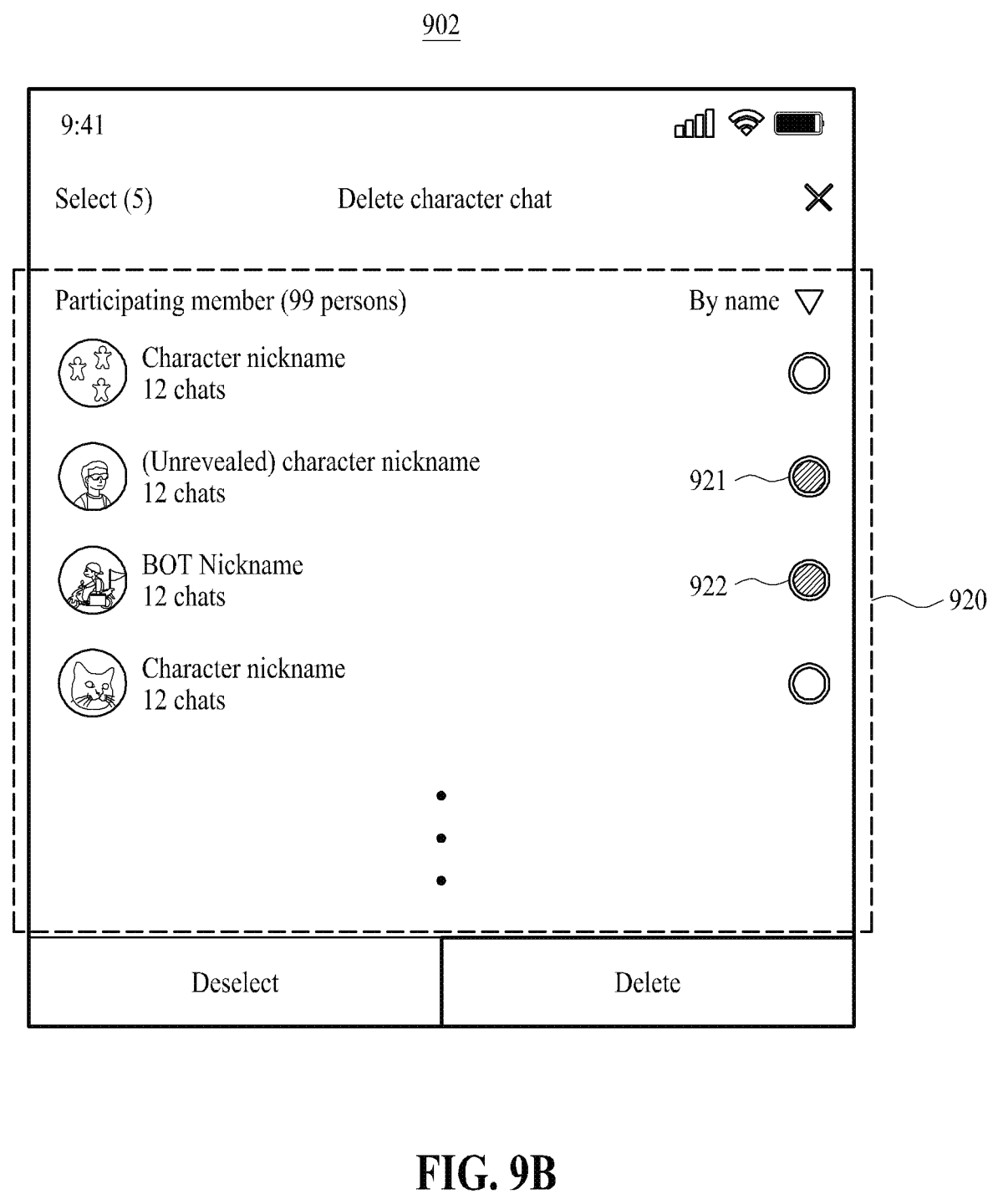

Select (5)                 Delete character chat                 ✕

Participating member (99 persons)                    By name ▽

Character nickname
12 chats (Unrevealed) character nickname        921
12 chats

BOT Nickname                           922
12 chats                                              920

Character nickname
12 chats

•
•
•

Deselect                              Delete

Figure 12A:
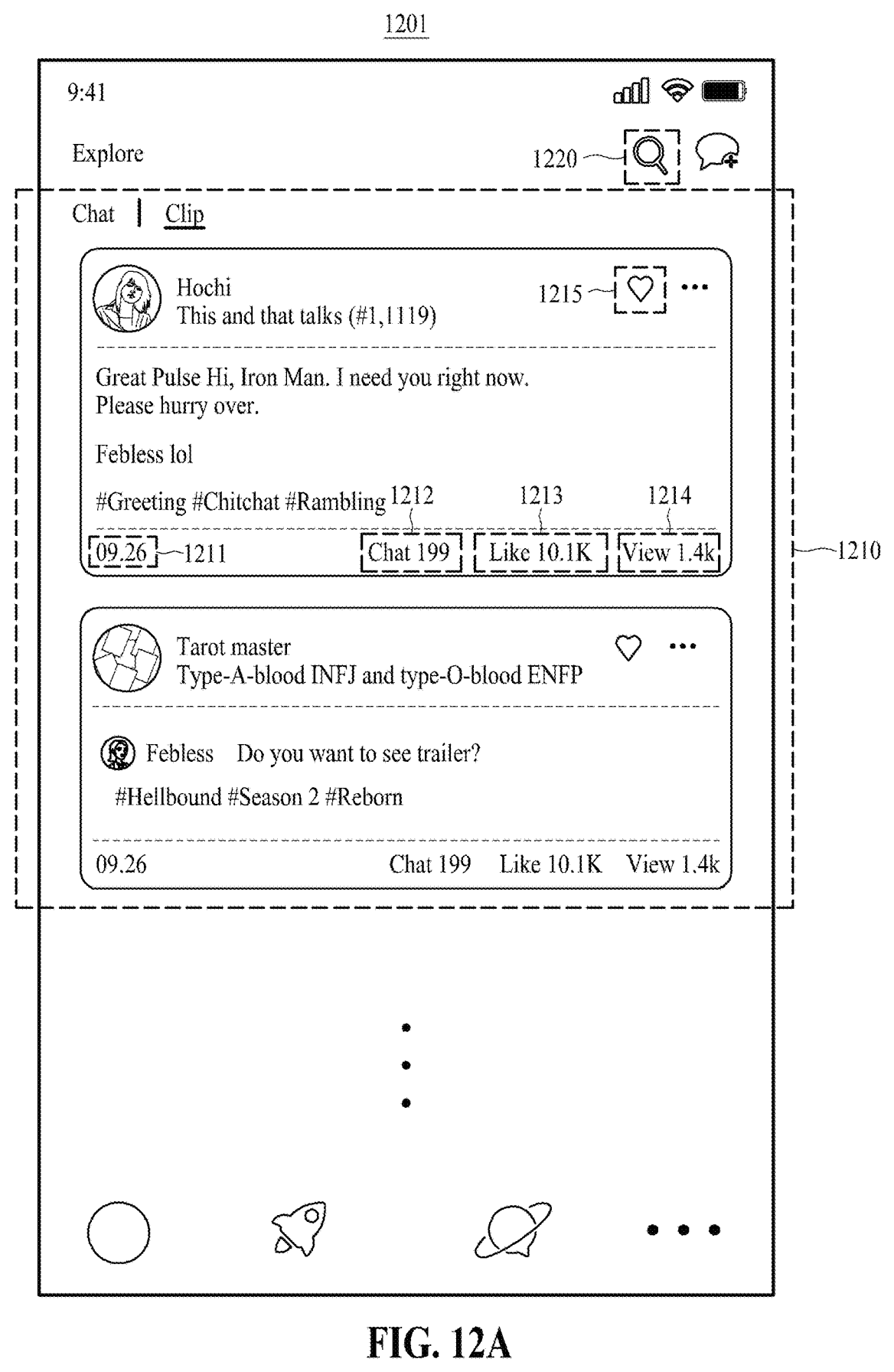

Explore     1220

Chat | Clip

Hochi
This and that talks (#1,1119)    1215

Great Pulse Hi, Iron Man. I need you right now.
Please hurry over.

Febless lol

Greeting #Chitchat #Rambling   1212     1213     1214

09.26 ~1211     Chat 199 | Like 10.1K | View 1.4k     ~1210

Tarot master
Type-A-blood INFJ and type-O-blood ENFP

Febless    Do you want to see trailer?
Hellbound #Season 2 #Reborn 09.26     Chat 199     Like 10.1K     View 1.4k

Figure 12C:
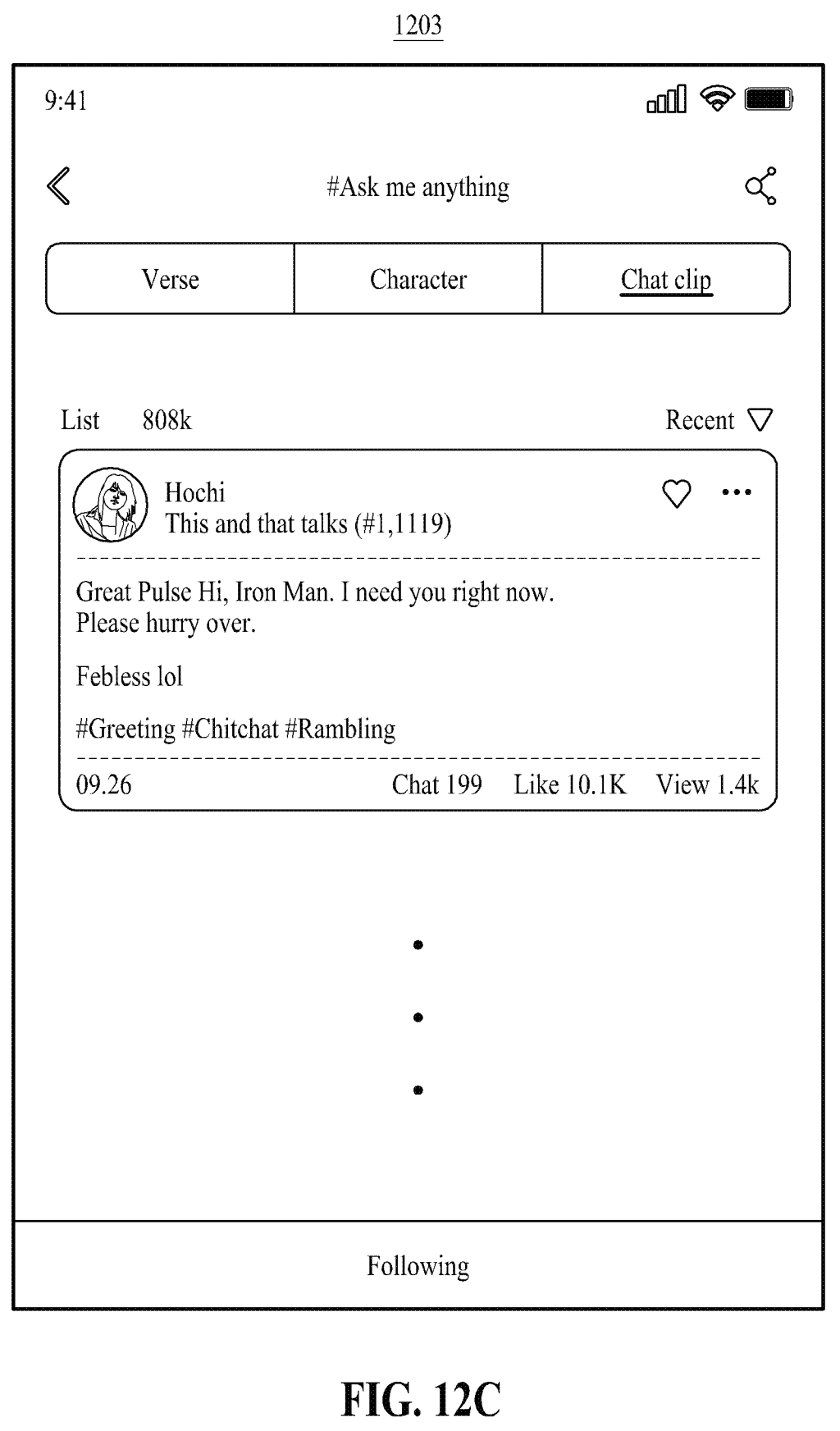

Ask me anything

| Verse | Character | Chat clip |
| --- | --- | --- |

List    808k            Recent ▽

Hochi
This and that talks (#1,1119)

---

Great Pulse Hi, Iron Man. I need you right now.
Please hurry over.

Febless lol

Greeting #Chitchat #Rambling

---

09.26           Chat 199    Like 10.1K    View 1.4k

•

•

•

Following

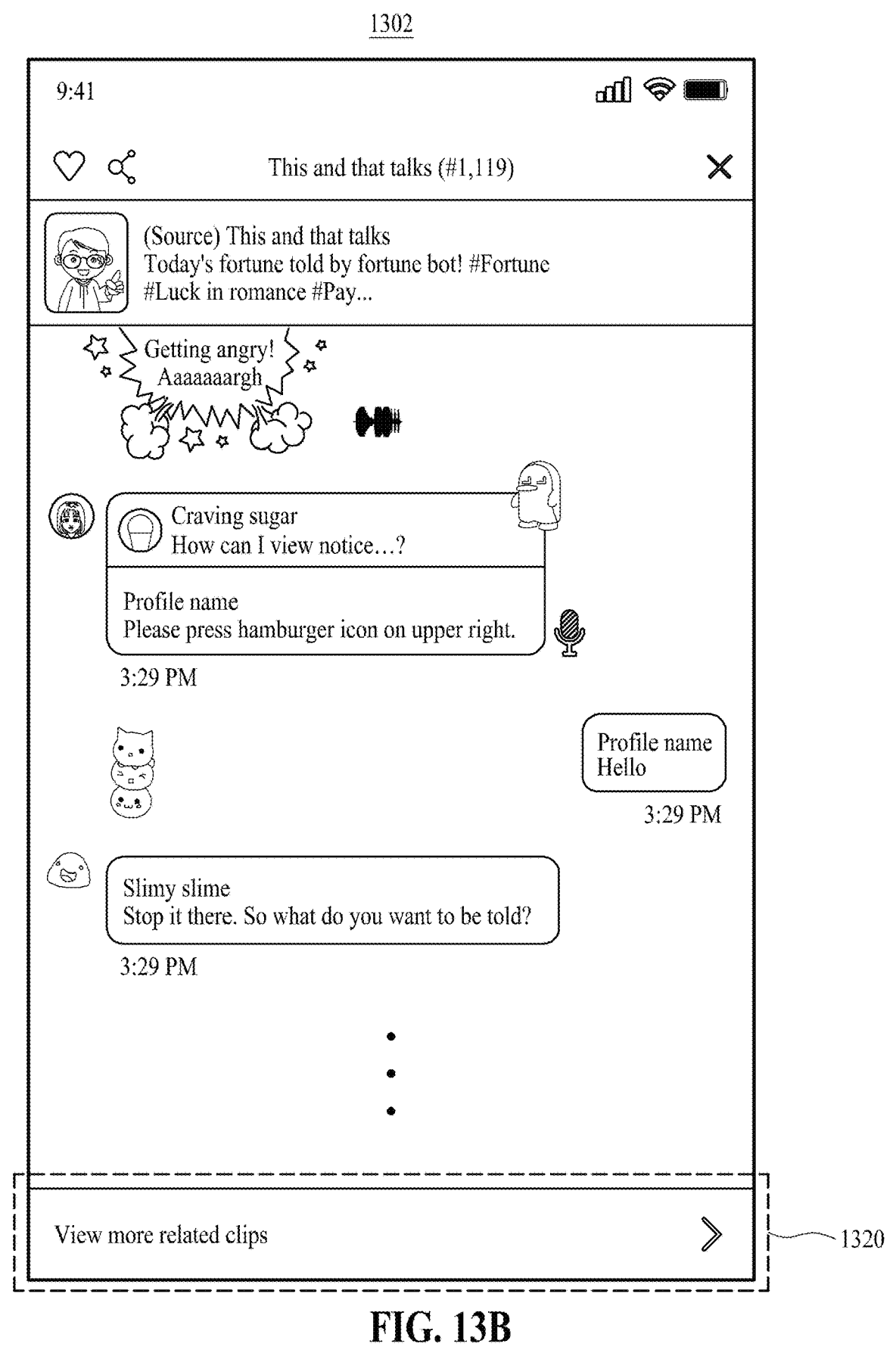

(Source) This and that talks
Today's fortune told by fortune bot! #Fortune #Luck in romance #Pay...

Getting angry!
Aaaaaaargh

Craving sugar
How can I view notice...?

Profile name
Please press hamburger icon on upper right.

3:29 PM

Profile name
Hello

3:29 PM

Slimy slime
Stop it there. So what do you want to be told?

3:29 PM

View more related clips     ⟩     1320

FIG. 13B

COMMUNICATION SYSTEM USING USER INTERFACES FOR DYNAMIC MODIFICATION OF CHAT COMMUNICATION ELEMENTS OF INSTANT MESSENGER

CROSS-REFERENCE TO RELATED APPLICATION(S)

This application claims priority to and the benefit of Korean Patent Application No. 10-2022-0169000, filed on Dec. 6, 2022, in the Korean Intellectual Property Office, the disclosure of which is incorporated herein by reference for all purposes.

BACKGROUND

With the development of mobile smart devices, the use of an online platform service to communicate with other users via a network has increased. The online platform services for interaction with other users may include, as representative examples, a social networking service (SNS), which is an online platform for generating and consolidating social relationships through communication among users, information sharing, and expansion of personal connections, and an instant messaging service (IMS), which is an online platform for real-time content communication between two or more users. With the increase of communication through mobile devices, the online platform services support a multilateral group chat, a multilateral group video chat, and other various types of communication methods, besides a 1:1 chat with other users.

SUMMARY

One or more aspects of the present disclosure provides technology for generating and viewing a chat clip, which may be content including a chat message.

A method and apparatus may provide an instant messaging service using one or more user interfaces associated with dynamic modification of previously-communicated chat messages of an instant messenger application. User interfaces of the executed messenger application and/or user interfaces of the chatroom interface may be improved and the communication interface associated with the dynamic modification of previously-communicated chat messages may be improved, for example, by providing dynamic chat modification interfaces for one or more chatrooms.

However, technical aspects are not limited to the foregoing aspect, and there may be other technical aspects.

An apparatus configured to modify a selected chat section of an instant messenger application may comprise: a display configured to receive at least one user input; a communication interface; one or more processors; and memory storing instructions that, when executed by the one or more processors, cause the apparatus to: display, in a user interface of an instant messenger application executing on the apparatus, a chatroom comprising a plurality of different chat messages previously transmitted between a plurality of different users; receive, via the user interface, a first user input indicating a user selection of a chat section comprising one or more chat messages of the plurality of different chat messages; receive, via the user interface, a second user input comprising an indication of one or more modifications to the chat section, wherein the one or more modifications to the chat section comprise a modification to an output method of the chat section; generate a chat clip by generating, based on the modification to the output method of the chat section, a modified version of the chat section; display, in the user interface of the instant messenger application executing on the apparatus, the chat clip; and cause a second computing device to display, in a second user interface of an instant messenger application executing on the second computing device, the chat clip.

The modification to the output method of the chat section may comprise an indication of a special effect, and wherein the instructions, when executed by the one or more processors, cause the apparatus to display the chat clip by causing the apparatus to display the special effect during display, by the apparatus, of the chat section.

The special effect may comprise one or more of: a modification to a background of the chat section, a modification to text content of at least one of the one or more chat messages, or output of an effect when the instant messenger application displays a certain scroll position corresponding to the chat section.

The one or more modifications to the chat section may further comprise a modification to a chat flow of the chat section, and wherein the instructions, when executed by the one or more processors, cause the apparatus to generate the chat clip by causing the apparatus to: insert a first chat message into the chat section, or delete a second chat message from the chat section.

The instructions, when executed by the one or more processors, may cause the apparatus to delete the second chat message by one or more of: deleting a user-selected chat message of the one or more chat messages of the chat section; or deleting the second chat message based on a determination that it was transmitted by an instant messenger application associated with a certain user account.

The instructions, when executed by the one or more processors, may cause the apparatus to: store, in a memory, the chat clip, wherein the stored chat clip is associated with a user that provided the second user input.

The instructions, when executed by the one or more processors, may cause the apparatus to: cause display, in a user interface that displays a profile page of a user account, of the chat clip.

The instructions, when executed by the one or more processors, may cause the apparatus to at least one of: transmit the chat clip via the chatroom; or generate a link configured to, upon access, enable posting of the chat clip on an external web page.

The instructions, when executed by the one or more processors, may cause the apparatus to generate the chat clip by one or more of: adding hashtag information to the chat clip; setting a condition for a scope of disclosure for the chat clip; or setting a condition of whether to disclose a profile of a user account transmitting a chat message comprised in the chat clip.

An apparatus configured to modify a selected chat section of an instant messenger application may comprise: a display configured to receive at least one user input; a communication interface; one or more processors; and memory storing instructions that, when executed by the one or more processors, cause the apparatus to: display, in a user interface of an instant messenger application executing on the apparatus, a chatroom comprising a plurality of different chat messages previously transmitted between a plurality of different users; receive, via the user interface, a first user input indicating a user selection of a chat section comprising one or more chat messages of the plurality of different chat messages; receive, via the user interface, a second user input comprising an indication of one or more modifications to the chat section, wherein the one or more modifications to the chat section comprise a modification to a chat flow of the chat section; generate a chat clip by generating, based on the modification to the output method of the chat section, a modified version of the chat section; display, in the user interface of the instant messenger application executing on the apparatus, the chat clip; and cause a second computing device to display, in a second user interface of an instant messenger application executing on the second computing device, the chat clip.

An apparatus configured to dynamically update display of modified messages transmitted via an instant messenger application may comprise: a display configured to receive at least one user input; a communication interface; one or more processors; and memory storing instructions that, when executed by the one or more processors, cause the apparatus to: display, in a user interface of an instant messenger application executing on the apparatus, a chatroom comprising a plurality of different chat messages previously transmitted between a plurality of different users, wherein the displaying the chatroom comprises displaying, in the user interface and in accordance with a first output method, a chat section comprising one or more chat messages; receive, from a second computing device and via an instant messenger application executing on the second computing device, a modification to the chat section that indicates a second output method different from the first output method; display, in the user interface of the instant messenger application executing on the apparatus, in response to the modification, and in accordance with the second output method, the chat section; receive, via the user interface, a user input indicating feedback information for the chat section; and transmit the feedback information.

A method for modifying a selected chat section of an instant messenger application may comprise: displaying, in a user interface of an instant messenger application executing on a first computing device, a chatroom comprising a plurality of different chat messages previously transmitted between a plurality of different users; receiving, via the user interface, a first user input indicating a user selection of a chat section comprising one or more chat messages of the plurality of different chat messages; receiving, via the user interface, a second user input comprising an indication of one or more modifications to the chat section, wherein the one or more modifications to the chat section comprise a modification to an output method of the chat section; generating a chat clip by generating, based on the modification to the output method of the chat section, a modified version of the chat section; displaying, in the user interface of the instant messenger application executing on the first computing device, the chat clip; and causing a second computing device to display, in a second user interface of an instant messenger application executing on the second computing device, the chat clip.

The modification to the output method of the chat section may comprise an indication of a special effect, and wherein the displaying the chat clip comprises: displaying the special effect during display, by the first computing device, of the chat section.

The special effect may comprise one or more of: a modification to a background of the chat section; a modification to text content of at least one of the one or more chat messages; or output of an effect when the instant messenger application displays a certain scroll position corresponding to the chat section.

The one or more modifications to the chat section may further comprise a modification to a chat flow of the chat section, and wherein the generating the chat clip comprises one or more of: inserting a first chat message into the chat section; or deleting a second chat message from the chat section.

The inserting the first chat message may comprise: inserting a new chat message that is different from any of the chat messages in the chat section.

The deleting the second chat message may comprise one or more of: deleting a user-selected chat message of the one or more chat messages of the chat section; or deleting the second chat message based on a determination that it was transmitted by an instant messenger application associated with a certain user account.

The method may further comprise: storing, in a memory, the chat clip, wherein the stored chat clip is associated with a user that provided the second user input.

The method may further comprise: causing display, in a user interface that displays a profile page of a user account, of the chat clip.

The method may further comprise: at least one of: transmitting the chat clip via the chatroom; or generating a link configured to, upon access, enable posting of the chat clip on an external web page.

The generating the chat clip may further comprise one or more of: adding hashtag information to the chat clip; setting a condition for a scope of disclosure for the chat clip; or setting a condition of whether to disclose a profile of a user account transmitting a chat message comprised in the chat clip.

A method for dynamically updating display of modified messages transmitted via an instant messenger application may comprise: displaying, in a user interface of an instant messenger application executing on a first computing device, a chatroom comprising a plurality of different chat messages previously transmitted between a plurality of different users, wherein the displaying the chatroom comprises displaying, in the user interface and in accordance with a first output method, a chat section comprising one or more chat messages; receiving, from a second computing device and via an instant messenger application executing on the second computing device, a modification to the chat section that indicates a second output method different from the first output method; displaying, in the user interface of the instant messenger application executing on the first computing device, in response to the modification, and in accordance with the second output method, the chat section; receiving, via the user interface, a user input indicating feedback information for the chat section; and transmitting the feedback information.

The second output method may cause the first computing device to output a special effect set for the chat section.

The method may further comprise: generating a link configured to, upon access, enable posting of the chat section as a chat clip on an external web page.

The transmitting the feedback information may comprise one or more of: updating a number of views corresponding to the chat section; or adding an indication of a reaction to the chat section.

A method for modifying a selected chat section of an instant messenger application may comprise: displaying, in a user interface of an instant messenger application executing on a first computing device, a chatroom comprising a plurality of different chat messages previously transmitted between a plurality of different users; receiving, via the user interface, a first user input indicating a user selection of a chat section comprising one or more chat messages of the plurality of different chat messages; receiving, via the user interface, a second user input comprising an indication of one or more modifications to the chat section, wherein the one or more modifications to the chat section comprise a modification to a chat flow of the chat section; generating a chat clip by generating, based on the modification to the output method of the chat section, a modified version of the chat section; displaying, in the user interface of the instant messenger application executing on the first computing device, the chat clip; and causing a second computing device to display, in a second user interface of an instant messenger application executing on the second computing device, the chat clip.

A non-transitory computer-readable storage medium may store instructions that, when executed by a processor, cause the processor to perform one or more methods described herein. Additional aspects of example embodiments will be set forth in part in the description which follows and, in part, will be apparent from the description or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which:

FIGS. 3A to 3D are diagrams each illustrating an example interface screen for generating a chat clip that is output to a terminal for executing the instant messenger:

FIG. 7 is a diagram illustrating an example interface screen on which a function of setting an auditory effect is executed, which is output to a terminal for executing the instant messenger:

FIGS. 9A and 9B are diagrams each illustrating an example interface screen on which a chat message deletion function is executed, which is output to a terminal for executing the instant messenger:

FIGS. 12A to 12C are diagrams each illustrating an example interface for providing a chat clip list output to a terminal for executing the instant messenger; and FIGS. 13A and 13B are diagrams illustrating an example screen output to a terminal for viewing a chat clip.

DETAILED DESCRIPTION

Figure 1:
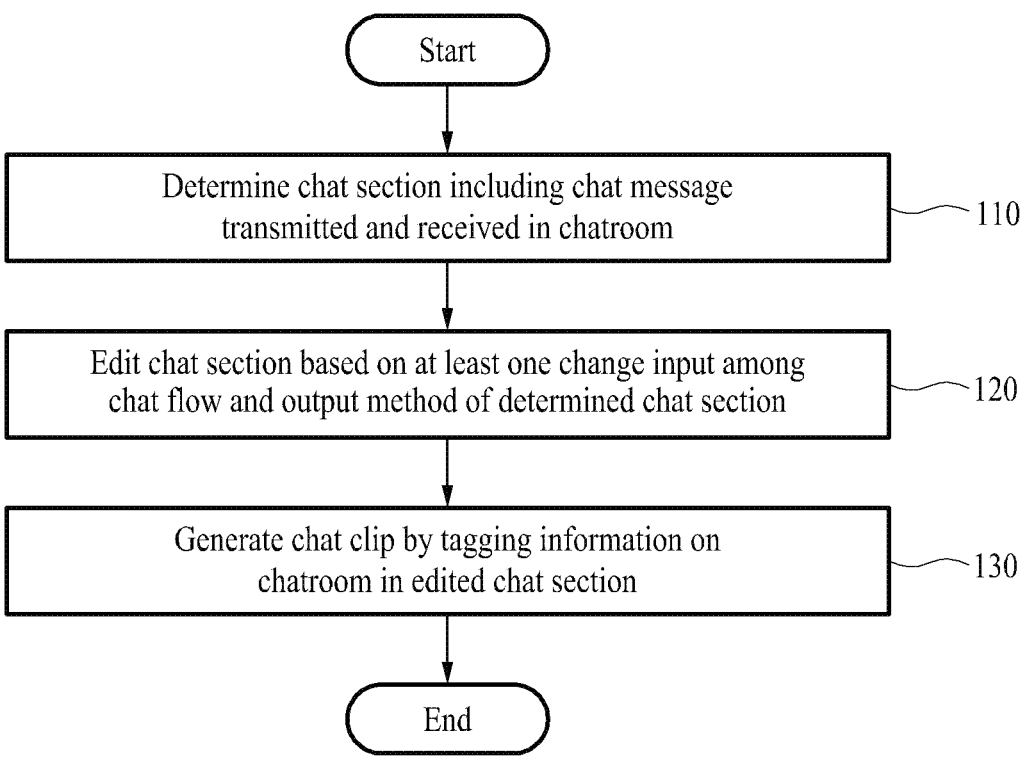
FIG. 1 is a flowchart illustrating an example operating method of an instant messenger.

The following detailed structural or functional description is provided as an example only and various alterations and modifications may be made to various features of the present disclosure. Here, examples are not construed as limited to the disclosure and should be understood to include all changes, equivalents, and replacements within the idea and the technical scope of the disclosure.

Terms, such as first, second, and the like, may be used herein to describe various components. Each of these terminologies is not used to define an essence, order or sequence of a corresponding component but used merely to distinguish the corresponding component from other component(s). For example, a first component may be referred to as a second component, and similarly the second component may also be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, embodiments will be described in detail with reference to the accompanying drawings. When describing the embodiments with reference to the accompanying drawings, like reference numerals refer to like elements and a repeated description related thereto will be omitted.

As will be detailed further below, aspects described herein improve the functioning of computers by, among other things, improving the usefulness, speed, and efficiency of instant messenger applications. Computer-implemented instant messaging, while handy, can be limited in that traditional text messages often lack context and, in most applications, cannot be easily edited or modified once they have been sent. This introduces numerous issues: for example, users may often send multiple messages when attempting to convey particular emotional concepts and/or might attempt to convey concepts using images (e.g., memes) rather than text. Such trends can waste bandwidth and other computing resources and can dissatisfy users, pushing them towards alternative means of communications (e.g., phone calls). By allowing users to go back and add modifications (e.g., special effects) to previously-transmitted messages, users can highlight, emphasize, and/or otherwise contextualize messages in a more efficient and pleasing way. In this way, bandwidth is preserved, and users of an instant messaging application can more readily enjoy the benefits of computer-implemented instant messaging. Moreover, this approach provides a useful pathway for the generation of new content (e.g., modified chat messages, such as an amusing reaction to a discussion) using already-existing content (e.g., the already-transmitted chat messages), meaning that the process described herein provides a way for users to use existing data to create humorous, interesting, and/or otherwise engaging content using computing devices with relatively low utilization of computing resources (and relatively low user effort).

As will also become more apparent based on the disclosure below, aspects described herein also provide a technical improvement to computing devices because aspects described herein improve the receipt and output of data using computing devices. Many computing devices, such as smartphones and tablets, have limited (and, commonly, small) output devices, such as small display screens. Moreover, input mechanisms on those devices can be limited: often, such devices lack physical keyboards or the like. As a result, it can be important to receive and output data in a manner that accounts for limitations associated with such display screens and such input modalities. The improvements described herein provide such an improvement by allowing users to add nuance to already-transmitted electronic communications in a way that is practical in circumstances where, for example, users might not want to type out additional messages (e.g., because doing so is time-consuming, might annoy others in a chatroom, and/or might be difficult given somewhat temperamental touchscreen-based keyboards). In this manner, users have the convenience of using simplistic input methods on computing devices (e.g., touch input methods) to provide context in chat applications in a way that is easy, generally touchscreen-friendly, and in a manner that avoids excessive additional messaging on instant messaging applications (which can become cumbersome to read, particularly on small display screens).

In turn, as also illustrated through the description below, aspects described herein are fundamentally rooted in instant messaging technology and the particularities of real-time communications. As such, aspects described herein could not be performed in the human mind and/or using pen and paper. For instance, the present disclosure relates to a process whereby users use particular computing elements (e.g., two different computing devices executing instant messenger applications), particularly where those users engage in computer-implemented activity (e.g., instant messaging, and in particular the context where messages have already been electronically sent). Moreover, many of the problems addressed by the present disclosure (e.g., making electronic communications more efficient by allowing additional context to be added to already-transmitted messages) are inherent to computing devices and are not analogous to any human activity.

FIG. 1 is a flowchart illustrating an operating method of an instant messenger.

The instant messenger may be an instant messenger application and/or an instant messenger web, which is installed in a user's terminal (e.g., a user terminal, such as a mobile phone, a tablet, a personal computer, etc.) and provides a function of transmitting and receiving instant messages among two or more participants including the user. The instant messenger may interoperate with one or more computing devices (e.g., a server). An instant messaging service may include a service that enables a plurality of users to chat in real time by transmitting text messages, voice messages, media files, and other instant messages through a network, such as wireless Internet or a wireless communication network, and services related thereto.

The server may interoperate with the instant messenger that is executed in a terminal for a user interface (UI), a function, an operation, or a service. An application may provide a UI to the terminal in which the application is installed. Via the UI provided by the application, the user's terminal may configure a screen, may input data, may transmit and receive data, may store data, and/or may perform other operations for the function of transmitting and receiving instant messages.

The user's terminal may be one of electronic devices, such as a computer, a portable computer, a wireless phone, a mobile phone, a smartphone, a personalized digital assistant (PDA), or a web tablet, and may refer to any device that may include a display and may install and execute an application (e.g., a computer program, a software application program, etc.).

The user may use the instant messaging service provided by the server by executing the instant messenger in the terminal. The user may generate a user account by subscribing to the instant messaging service via the instant messenger. The user may use the instant messaging service via the terminal of a user account subscribing to the instant messaging service. The terminal of the user account subscribing to the instant messaging service may be a terminal logging in with the user account subscribing to the instant messaging service.

Referring to FIG. 1, the operating method of the instant messenger may include an operating method of the instant messenger for generating a chat clip. The chat clip may be content including a chat message and may include content that may be processed such that the chat message transmitted and received in a chatroom may be posted and/or shared. The chat clip may include one or more chat messages transmitted and received in a chatroom. The chat clip may include information on the chatroom in which the chat messages are transmitted and received.

The operating method of the instant messenger may include operation 110 of determining a chat section including a chat message transmitted and received in a chatroom. The chat section may include one or more chat messages transmitted and received in a chatroom. The chatroom may be a chatroom generated by executing the instant messaging service and may include, for example, a chatroom generated by the user's request received by the server through the instant messenger to open the chatroom. The chatroom may be a virtual space in which one or more user accounts participate for transmitting and receiving chat messages. The chatroom may include a chatroom with the user themselves in which only one user account participates, a 1:1 chatroom in which two user accounts participate, a group chatroom in which three or more user accounts participate, or a chatroom in which at least one user account and at least one chatbot participate. The chatroom may include a chatroom in which a user account may participate through the invitation of a user account that requested the opening of the chatroom or a user account that is already participating in the chatroom; or a chatroom in which a user account may participate through a link.

An identifier corresponding to a participating user account may be exposed through a chatroom. The identifier corresponding to a user account may include the profile information (e.g., a profile name or a profile photo) of the user account. The profile information of the user account may include at least one of the name, identification (ID), and profile photo of the user account registered in the instant messaging service.

A profile corresponding to a single user account may include two or more profiles. At least some of the ID information included in each of the two or more profiles may vary. For example, a profile name included in a first profile may be different from a profile name included in a second profile among a plurality of profiles corresponding to the same user account, and a profile photo included in the first profile may be different from a profile photo included in a third profile among the plurality of profiles corresponding to the same user account. The user account may select a profile to be used in a chatroom from among the plurality of profiles. An identifier corresponding to the selected profile to be used in the chatroom by the user account may be exposed through the chatroom.

In an example, the profile information of the user account may include the real name information of the user. The real name information may be information representing the user themselves and may include, for example, information, such as the real name or photo of an actual user, introducing the actual user.

In an example, the profile information of the user account may include virtual character information set by the user. The virtual character information may be information about a fictional character, not a real person, and may include, for example, at least one of a nickname set by the user instead of the user's real name and a profile photo including the character's image.

In an example, the identifier corresponding to the user account may include temporary profile information set by the user when participating in the chatroom. The temporary profile information may include at least one of a nickname, false name, and photo that are randomly set by the user to participate in the chatroom.

The generation of a chat clip may be requested through a chatroom in which the user account of the terminal is participating. Based on the request to generate a chat clip, an interface for determining a chat section may be provided to the terminal. The user may select at least one chat message transmitted and received in the chatroom through the interface. The chat section may be determined to be a section including the selected chat message. In an example, the chat section may be determined to be a section including one or more consecutive chat messages. In an example, the chat section may include a plurality of nonconsecutive sections. For example, when chat messages are transmitted and received in an order of a first chat message, a second chat message, a third chat message, and a fourth chat message, the determined chat section may include the first chat message, the second chat message, and the fourth chat message. The chat section may include a first section including the first chat message and the second chat message that are consecutive and a second section including the fourth chat message. Since there is the third chat message between the first section and the second section, the first section and the second section may be the plurality of nonconsecutive sections.

The operating method of the instant messenger may include operation 120 of editing the chat section based on at least one change input among a chat flow and output method of the determined chat section.

Operation 120 of editing the chat section may include an operation of setting a special effect corresponding to the chat section, based on a change input of the output method of the chat section. The special effect may include a visual effect. For example, the setting of the visual effect may include adding an icon, changing the form of a chat message, or adding an animation (e.g., blinking) effect. The special effect may include an auditory effect. For example, the setting of the auditory effect may include adding a sound effect, adding background music, or adding the user's voice. The special effect may include a tactile effect. For example, the setting of the tactile effect may include adding vibration.

The operation of setting the special effect may include an operation of setting a special effect for a chat message included in the chat section. The special effect may be set for at least some of chat messages included in the chat section. For example, the setting of the special effect for a chat message may include at least one of changing the form of a speech balloon of the chat message, changing the form of the text of the chat message, adding an icon to the chat message, and adding an animation effect, such as blinking, to the speech balloon of the chat message.

The operation of setting the special effect may include an operation of setting a special effect for a certain scroll position of a page corresponding to the chat section. The page corresponding to the chat section may be a page displaying a chat clip corresponding to the chat section. When the size of the page displaying the chat clip is greater than the size of a page that may be output on a screen at once, the page displaying the chat clip may be implemented to change an area of a page that is output through scrolling. In an example, the scrolling may be changed automatically or manually. The automatic change of the scrolling may include at least one of the scrolling that is set to change automatically at a certain speed in a certain direction and the scrolling changing automatically according to a direction of the user's eyes by recognizing the user's line of sight. The setting of the special effect for the certain scroll position may mean setting to execute the special effect when a scroll position of the terminal outputting the page corresponding to the chat section is at a certain position. For example, when the position of the scroll of the terminal is at the certain position, the special effect may be set such that at least one of an icon, a sound effect, and an animation is output.

The operation of setting the special effect may include an operation of setting a special effect for the background of the chat section. For example, the special effect may be set such that an icon or an animation may be output in a certain area of the background displaying a chat message. The special effect set for the background may not change even though the scroll position changes.

The operation 120 of editing the chat section may include an operation of inserting a chat message into the chat section, based on a change input of the chat flow of the chat section. In an example, the operation of inserting the chat message may include an operation of inserting a new chat message different from a chat message already included in the chat section. For example, the new chat message may be inserted into the chat section as a message sent by a randomly generated account. For example, the new chat message may be inserted as a speech balloon that is different from the speech balloon of the chat message already included in the chat section.

The operation 120 of editing the chat section may include an operation of deleting a chat message from the chat section, based on the change input of the chat flow of the chat section. In an example, the operation of deleting the chat message may include an operation of deleting a certain chat message selected from among chat messages included in the chat section. In an example, the operation of deleting the chat message may include an operation of deleting a chat message transmitted by a certain user account selected from among the chat messages included in the chat section.

The operation 120 of editing the chat section may include an operation of editing time information on when a chat message included in the chat section is transmitted. The time information on when a chat message is transmitted may be changed to a random date or time or a date or time that is input by the user requesting the generation of the chat clip.

The operating method of the instant messenger may include operation 130 of generating the chat clip by tagging information on a chatroom in the edited chat section. The information on the chatroom tagged in the chat clip may include link information linked to the chatroom. The terminal may access the chatroom in which the chat clip is generated through the chat clip. In the chatroom in which the chat clip is generated, the chat clip may include information on a start position of the chat section corresponding to the chat clip and/or information on an end position corresponding to the chat clip. The information on the start position of the chat section corresponding to the chat clip may include link information linked to the start position of the chat section in the chatroom. The information on the end position of the chat section corresponding to the chat clip may include link information linked to the end position of the chat section in the chatroom.

In an example, the operation of generating the chat clip may include an operation of adding hashtag information to the chat clip. A hashtag may be input by the user. The hashtag may be used to search for the chat clip. For example, when a certain hashtag is input as a search word, a chat clip including the hashtag may be provided as a search result. In an example, the operation of generating the chat clip may include an operation of setting a condition for the scope of the disclosure for the chat clip. The condition for the scope of disclosure may be the scope of accounts (e.g., a list of accounts) to which the disclosure of the chat clip is allowed and may include, for example, at least one of a condition for disclosure to an account in a friend relationship, a condition for disclosure to an account belonging to a certain group, a condition for disclosure to all accounts, and/or a condition for disclosure to an account inputting a password.

In an example, the operation of generating the chat clip may include an operation of setting a condition of whether to disclose a profile of a user account transmitting a chat message included in the chat clip. If the profile of the user account transmitting the chat message is set to be disclosed, the profile of the user account transmitting the chat message may be displayed together with the chat message through the chat clip. If the profile of the user account transmitting the chat message is set not to be disclosed, the profile photo of the user account transmitting the chat message may be pixelated, the profile photo of the user account transmitting the chat message may be changed to a random image, the profile name of the user account transmitting the chat message may be changed randomly, or the profile name of the user account transmitting the chat message may be omitted such that the original profile information of the user account transmitting the chat message may be unknown. The condition of whether to disclose the profile of the user account may be set by the user account requesting the generation of the chat clip or the user account transmitting the chat message.

In an example, the operation of generating the chat clip may include an operation of setting a condition of whether to display the time information on when the chat message is transmitted. In an example, the time information may include at least one of date and time. If the time information is set to be displayed, the time information on when the chat message is transmitted may be displayed together with the chat message. If the time information is set not to be displayed, the time information on when the chat message is transmitted may not be displayed.

The operating method of the instant messenger may include an operation of storing the generated chat clip corresponding to the user account requesting the generation of the chat clip. The chat clip may be stored in a chat clip storage corresponding to the user account requesting the generation of the chat clip. The chat clip storage may store the chat clip generated by the request of the user account. The chat clip may be generated through a chatroom in which the user account participates. For example, the chat clip storage may include a first chat clip, a second chat clip, and a third chat clip, in which the first chat clip is generated through a first chatroom in which the user account participates, the second chat clip is generated through the first chatroom, and the third chat clip is generated through a second chatroom.

The operating method of the instant messenger may include an operation of posting the generated chat clip to a profile page of a user account. The profile page of the user account may be a page providing the information on the user account and may be, for example, a page displaying the profile information of the user account, the information on another user account in a certain relationship with the user account, or a chat clip generated by the user account. The profile page of the user account may allow access of a terminal of the other user account. In an example, the profile page of the user account may be set to allow access of terminals of all user accounts. In an example, the profile page of the user account may be set to allow access of the terminal of the other user account in a certain relationship with the user account and restrict access of terminals of other user accounts not in the certain relationship with the user account.

The operating method of the instant messenger may include an operation of transmitting a chat clip through a chatroom, based on a sharing request for the chat clip. The generated chat clip may be transmitted to another chatroom as a chat message. A participant in the other chatroom may view the chat clip. A terminal of the participant of the other chatroom may access a tagged chatroom through the chat clip.

The operating method of the instant messenger may include an operation of generating a link for posting the chat clip to an external web page, based on the sharing request for the chat clip. The link corresponding to the chat clip may be posted to the external web page. If the chat clip is posted to the external web page, the chat clip may be output through the external web page. The chat clip may be output through the external web page in the same form as the chat clip output in the instant messenger (or may be output in an adjusted format). For example, a special effect set for the chat clip may be output through the external web page.

Figure 2:
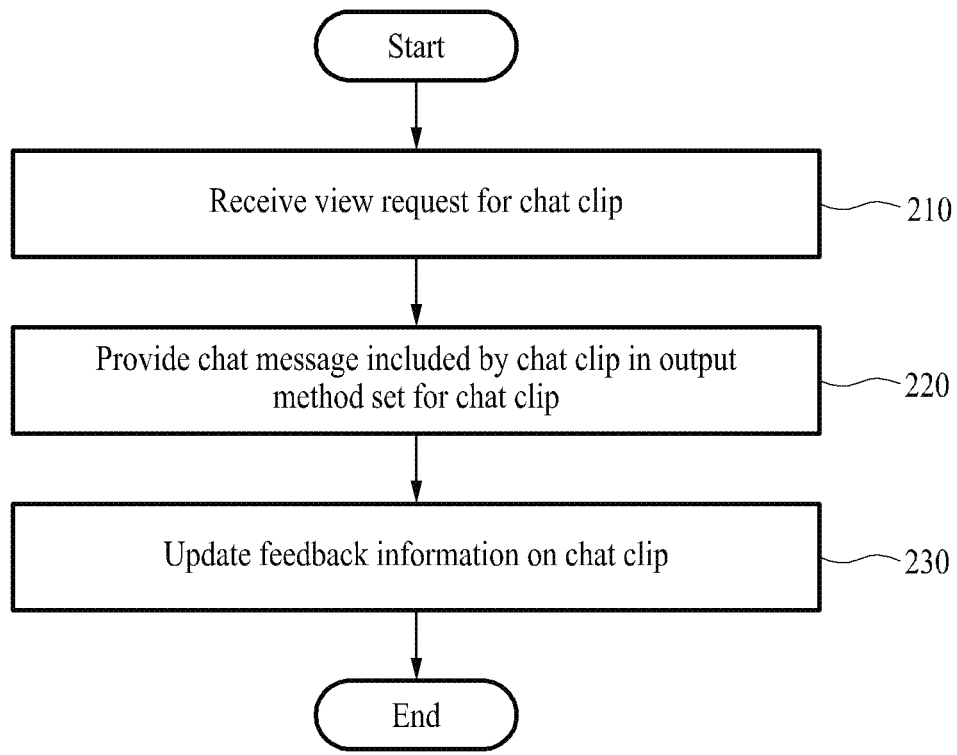
FIG. 2 is another flowchart illustrating an example operating method of the instant messenger.

FIG. 2 is another flowchart illustrating an operating method of the instant messenger.

Referring to FIG. 2, the operating method of the instant messenger may include an operating method of the instant messenger for viewing a chat clip.

The operating method of the instant messenger may include operation 210 of receiving a view request for the chat clip. The viewing of the chat clip may be requested through a space in which the chat clip is stored, posted, or shared. In an example, the viewing of the chat clip may be requested through a profile page to which the chat clip is posted. In an example, the viewing of the chat clip may be requested through a chat clip list including one or more chat clip items provided to a terminal. In an example, the viewing of the chat clip may be requested through a chatroom through which the chat clip is shared. In an example, the viewing of the chat clip may be requested through an external web page including a link to the chat clip. The view request for the chat clip may include a view request for a chat clip generated by another user account.

The operating method of the instant messenger may include operation 220 of providing a chat message included by the chat clip in an output method set for the chat clip. Operation 220 of providing the chat message may include an operation of outputting a special effect set for the chat clip. As described above, the special effect may be set for a certain chat message included in the chat clip. If the certain chat message is output to a terminal for viewing the chat clip, the set special effect may be output. The special effect may be set for the background of the chat clip. The set special effect may be output to the background of the chat clip in the terminal for viewing the chat clip. The special effect may be set for a certain scroll position of the chat clip. When a scroll position of the terminal for viewing the chat clip is at the certain scroll position, the set special effect may be output.

The operating method of the instant messenger may include operation 230 of updating feedback information on the chat clip. The feedback information may be information on the intention for or reaction to the chat clip and may include, for example, the number of views, the number of displayed reactions (e.g., 'like'), or the number of shares.

In an example, operation 230 of updating the feedback information may include an operation of updating the number of views of the chat clip, based on the view request for the chat clip. The chat clip may include view count information. A view count is a value recording the number of views of the chat clip and the view count information may be exposed to the chat clip. The view count information may be updated when the chat clip is viewed. In an example, operation 230 of updating the feedback information may include an operation of updating the feedback information on the reaction to the chat clip, based on a reaction input to the chat clip. The reaction input may be an input of displaying the intention for the chat clip and may include, for example, operations of displaying reactions (e.g., 'like') for the chat clip, setting the chat clip as a target of interest or favorite, or clipping or sharing the chat clip.

The operating method of the instant messenger may include an operation of providing a link to a chatroom tagged by the chat clip. The chatroom tagged by the chat clip may be a chatroom in which the chat clip is generated, and information on the chatroom may be tagged by the chat clip when the chat clip is generated. The terminal may access the chatroom in which the chat clip is generated through the chat clip.

FIGS. 3A to 3D are diagrams each illustrating an interface screen for generating a chat clip that is output to a terminal for executing the instant messenger.

Figure 3A:
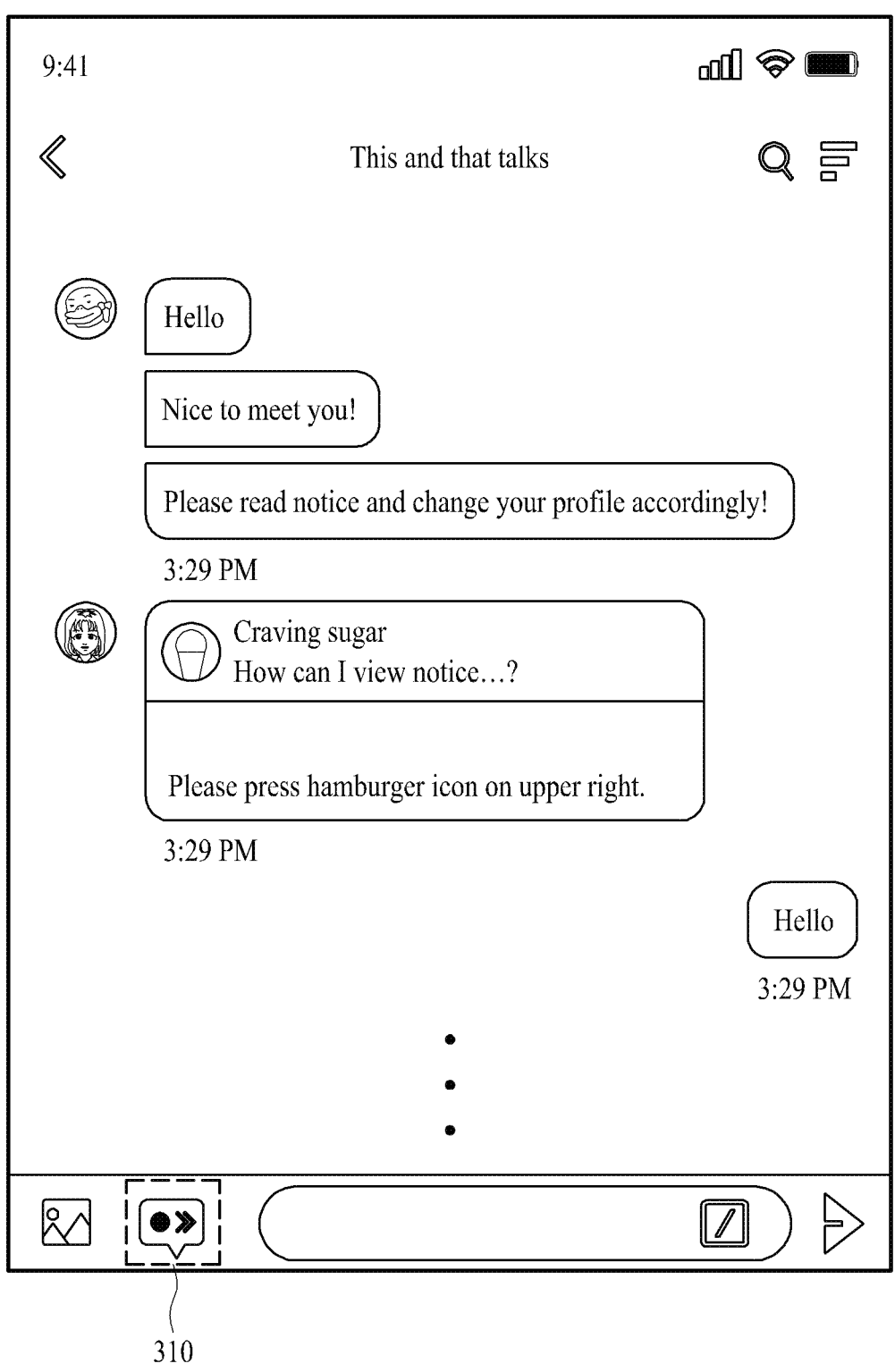

Referring to a screen 301 of FIG. 3A, a chatroom interface in which a user account of the terminal is participating may be provided through the terminal. Chat messages transmitted and received in the chatroom may be displayed through the chatroom interface. The function of inputting and transmitting chat messages may be provided through the chatroom interface. The chatroom interface may include an interfacing object 310 for requesting the generation of a chat clip. A chat clip request signal may be transmitted through an input of selecting the interfacing object 310. A screen 302 for determining a chat section of FIG. 3B may be provided through the input of selecting the interfacing object 310.

Figure 3B:
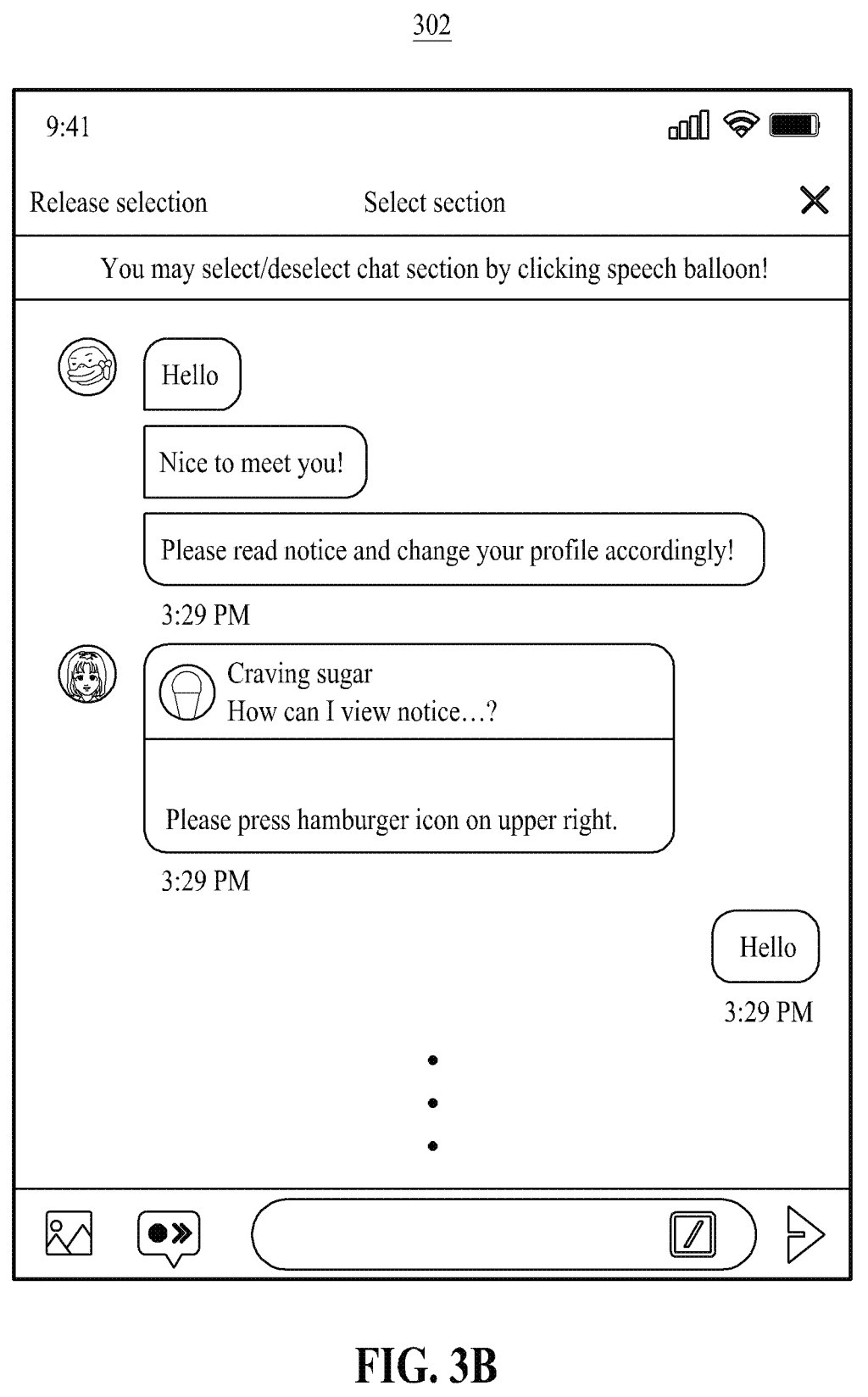

Referring to the screen 302 of FIG. 3B, one or more chat messages to be included in the chat section may be selected from among chat messages transmitted or received in the chatroom. In an example, a chat message displayed in a certain area may be selected by an input of selecting the certain area. A chat section including the chat message selected by an input of selecting the chat message may be determined.

Referring to a screen 303 of FIG. 3C, a chat section including a first chat message 321, a second chat message 322, and a third chat message 323 may be determined. In an example, the chat section may be determined by an input of selecting each of the first chat message 321, the second chat message 322, and the third chat message 323. In an example, the chat section starting from the first chat message 321 and ending with the third chat message 323 may be determined by an input of selecting the first chat message 321 and the third chat message 323. In other words, the chat section including the second chat message 322, which is transmitted and received between the first chat message 321 and the third chat message 323, other than the first chat message 321 and the third chat message 323 may be determined by the input of selecting the first chat message 321 and the third chat message 323. In another example, in at least some implementations, the second chat message 322 may not be included in the chat section, which may include the non-contiguous sections corresponding to the first chat message 321 and the third chat message 323. The selected first, second, and third chat messages 321, 322, and 333 may be displayed in the interface to be distinguished from unselected chat messages. For example, the unselected chat messages may be displayed with shading and the selected first, second, and third chat messages 321, 322, and 333 may be displayed without shading. For example, an indicator indicating that the unselected chat messages may be selected as chat messages included in the chat section as they are adjacent to the selected first, second, and third chat messages 321, 322, and 333. For example, the section including the first, second, and third chat messages 321, 322, and 323 selected by an input of selecting an interfacing object 330 for determining a section may be determined to be the chat section for generating a chat clip.

Figure 3D:
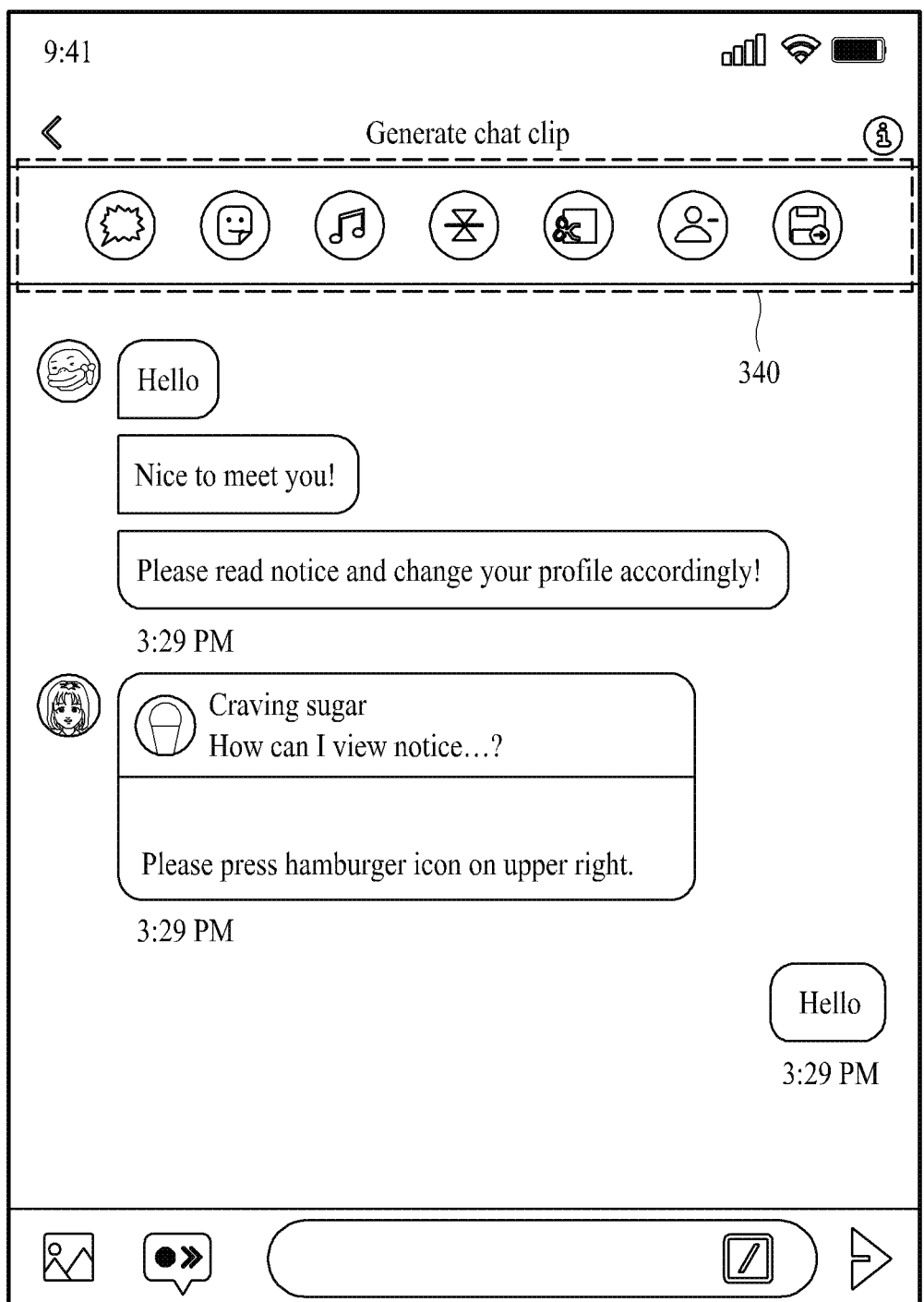

Referring to a screen 304 of FIG. 3D, when the chat section is determined, a tool 340 (e.g., a chat section editing tool) for generating a chat clip may be provided through the chatroom interface. The tool 340 for generating a chat clip may execute a function of editing a chat section. For example, the function of editing a chat section may include at least one function of setting a special effect and editing and storing a chat message.

Figure 4A:
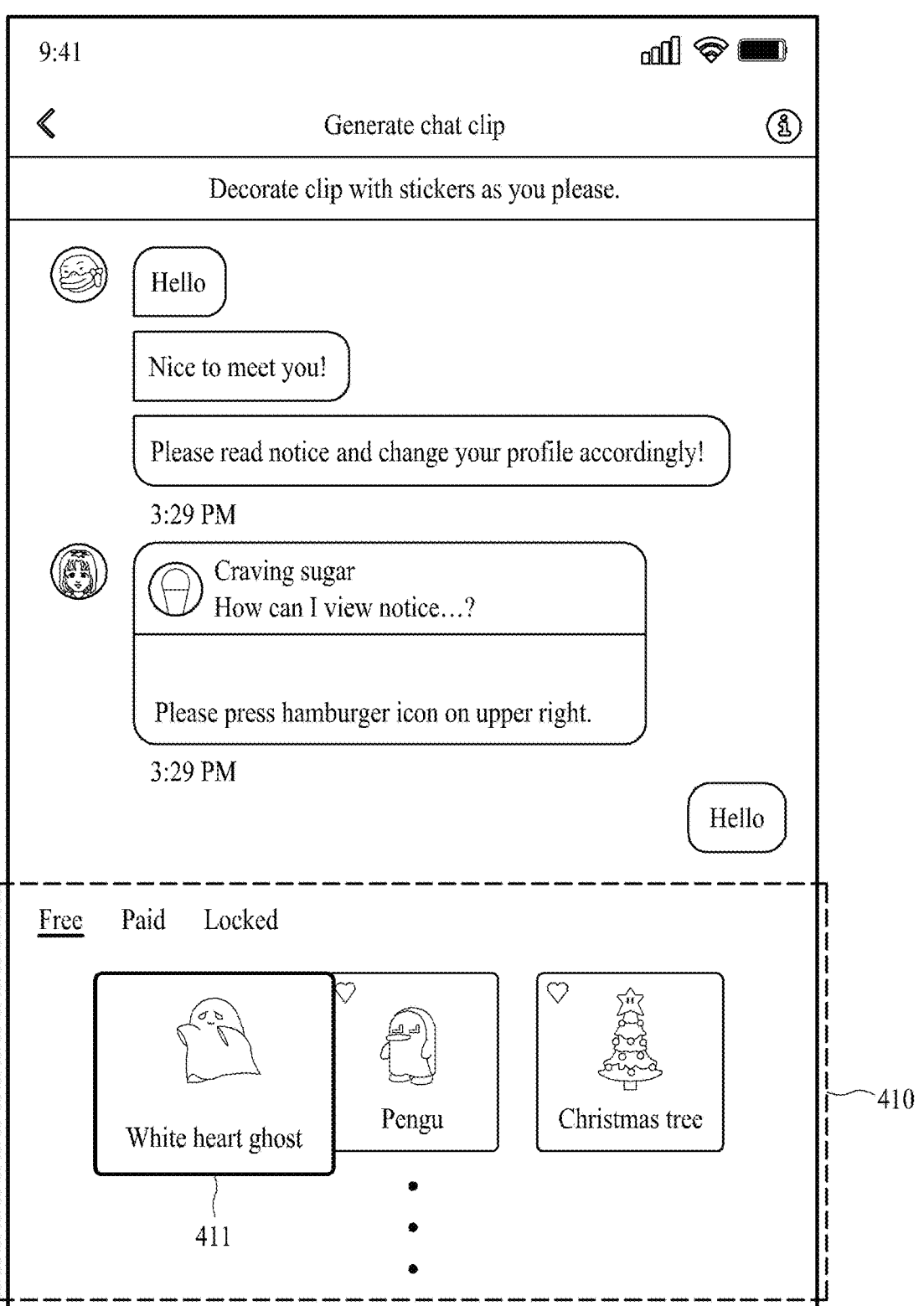
FIGS. 4A and 4B are diagrams each illustrating an example interface screen on which an icon addition function is executed, which is output to a terminal for executing the instant messenger.
Figure 4B:
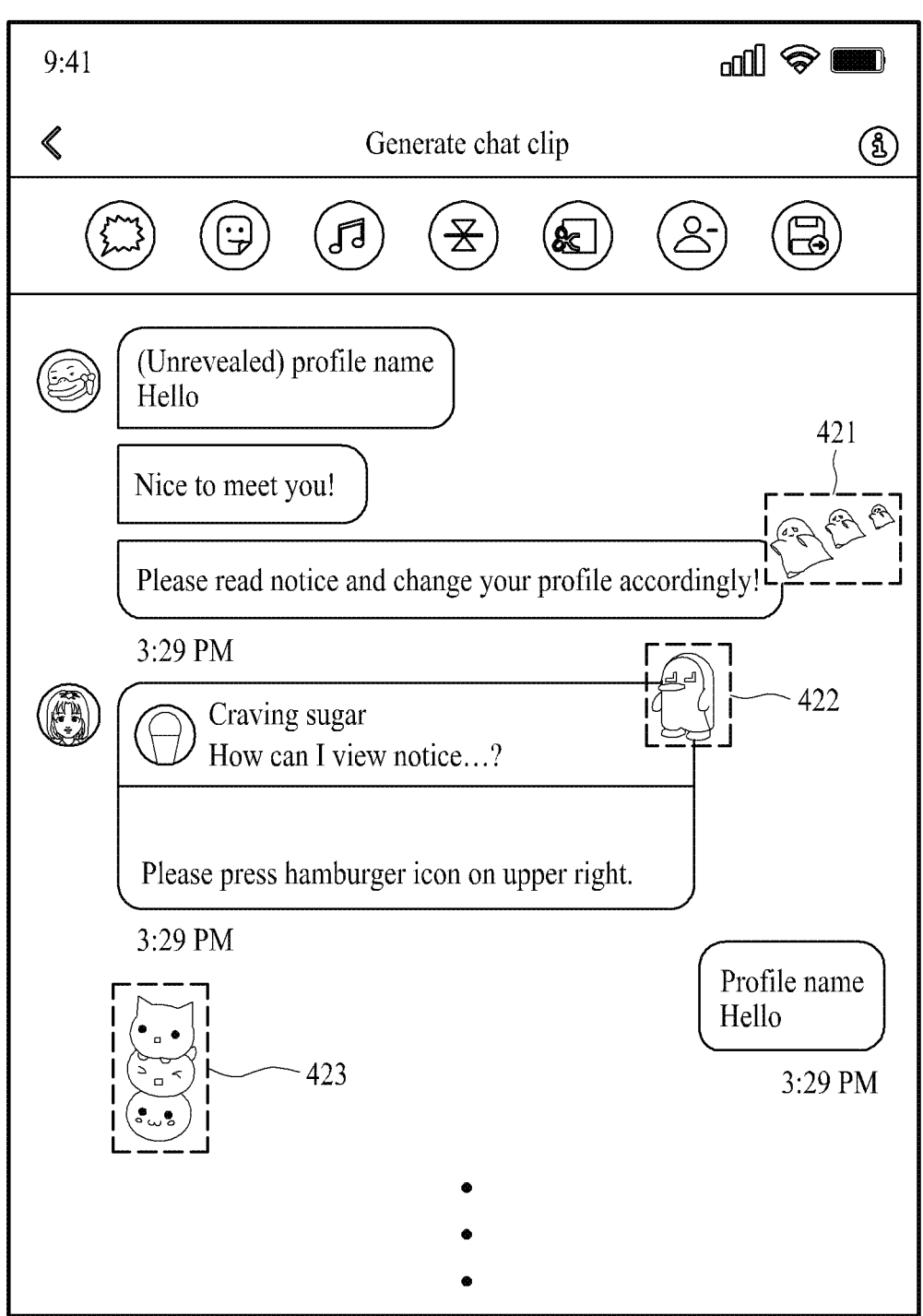

FIGS. 4A and 4B are diagrams each illustrating an interface screen on which an icon addition function is executed, which is output to a terminal for executing the instant messenger.

If a chat section for generating a chat clip is determined, a function of editing the determined chat section may be executed. The function of editing the chat section may include a special effect setting function. In an example, the special effect setting function may be executed by a change input of an output method of the chat section by a user. When executing the special effect setting function, an interface for adding a special effect may be provided.

The special effect setting function may include the icon addition function. For example, the icon addition function may be executed by an input of selecting a first interfacing object included in the tool 340 of FIG. 3D for generating a chat clip.

Referring to a screen 401 of FIG. 4A, when executing the icon addition function, an interface for adding an icon may be provided. An icon list 410, which may be added through the interface, may be provided. An icon (e.g., an icon 411) to be added to an area of the chat section may be selected from the icon list 410. A position to which the selected icon 411 is added may be designated. In an example, the selected icon 411 may be set to be added in an area displaying a chat message or a background.

Referring to a screen 402 of FIG. 4B, a preview of the chat clip for which a special effect is set may be provided. As illustrated in the screen 402, the chat clip may be generated with a plurality of icons 421, 422, and 423 added to the area of the chat section.

Figure 5A:
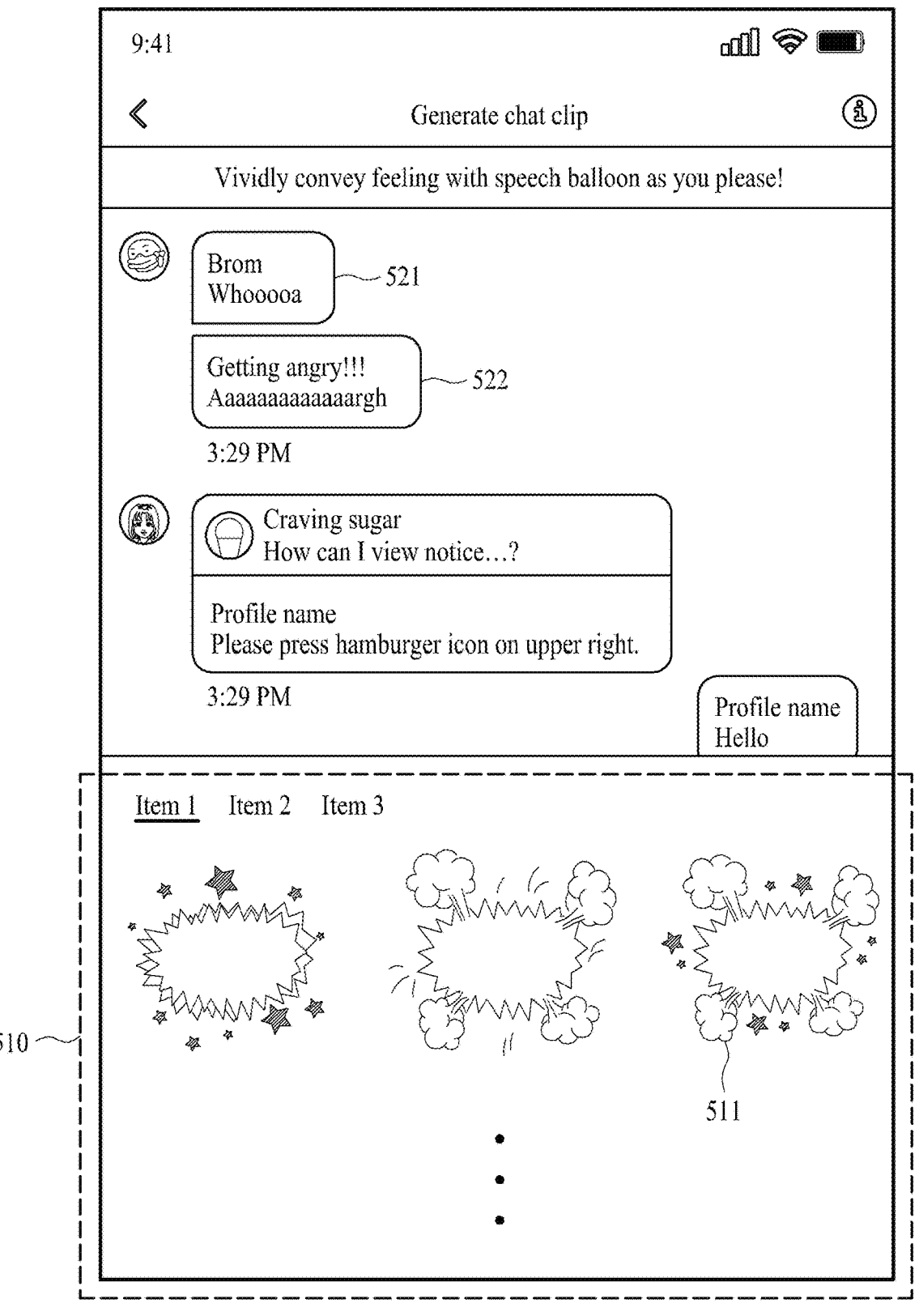
FIGS. 5A and 5B are diagrams each illustrating an example interface screen on which a speech balloon form change function is executed, which is output to a terminal for executing the instant messenger.
Figure 5B:
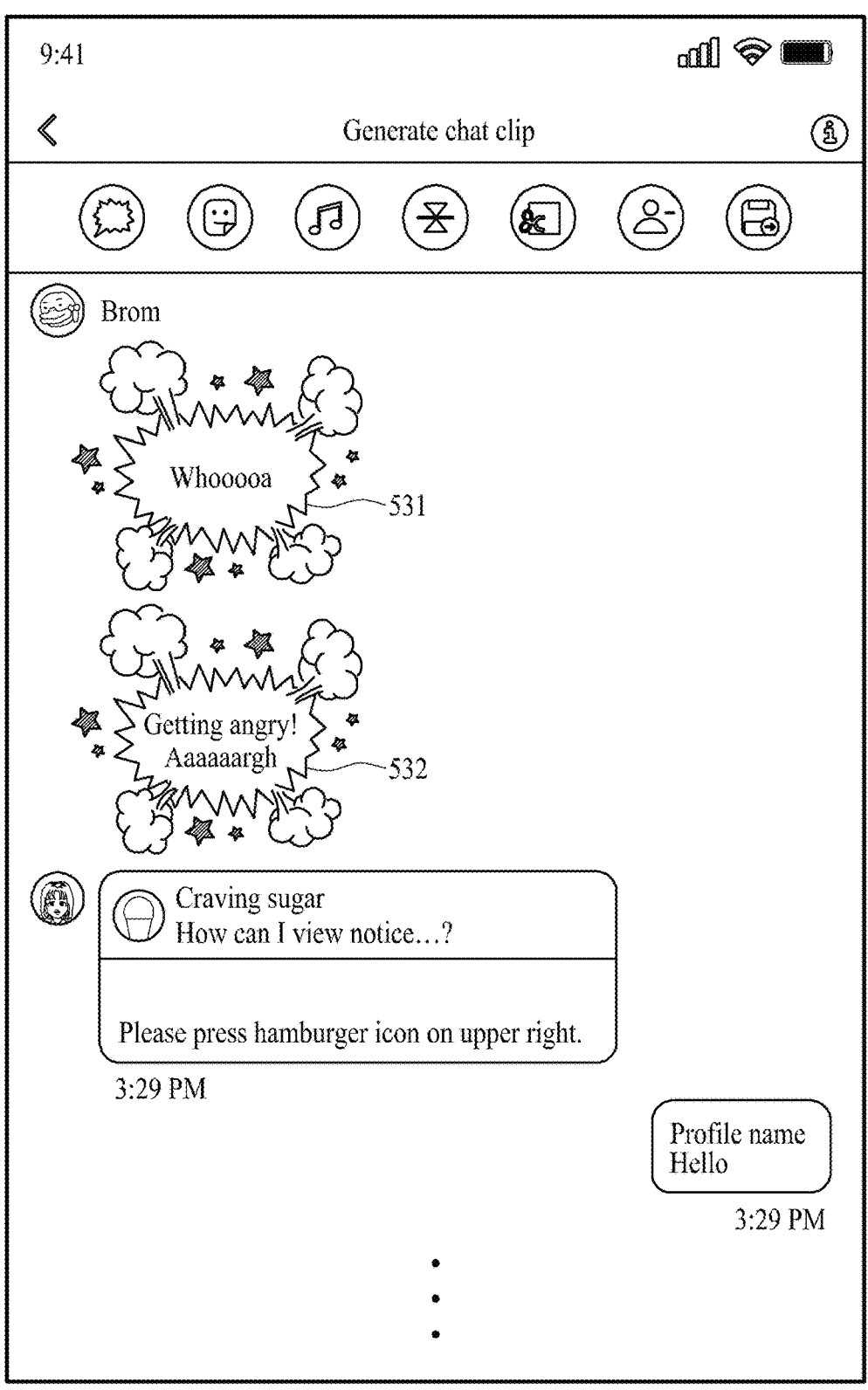

FIGS. 5A and 5B are diagrams each illustrating an interface screen on which a speech balloon form change function is executed, which is output to a terminal for executing the instant messenger.

A special effect setting function may include the speech balloon form change function. For example, the speech balloon form change function may be executed by an input of selecting a second interfacing object of the tool 340 of FIG. 3D for generating a chat clip.

Referring to a screen 501 of FIG. 5A, when executing the speech balloon form change function, an interface for changing a speech balloon form may be provided. A speech balloon form list 510 may be provided through the interface. A speech balloon form (e.g., a speech balloon form 511) to be applied to a chat message included in a chat section may be selected from the speech balloon list 510. A chat message of which the speech balloon form is to be changed may be selected from among chat messages included in the chat section. The speech balloon of the selected chat message may be changed to the selected speech balloon form 511. For example, if chat messages 521 and 522 are selected as chat messages of which the speech balloon form is to be changed from among the chat messages included in the chat section, the speech balloons of chat messages 521 and 522 may be changed to the selected speech balloon form 511. As illustrated in a screen 502 of FIG. 5B, a chat clip may include the chat messages 531 and 532 of which the speech balloon form is changed.

Figure 6A:
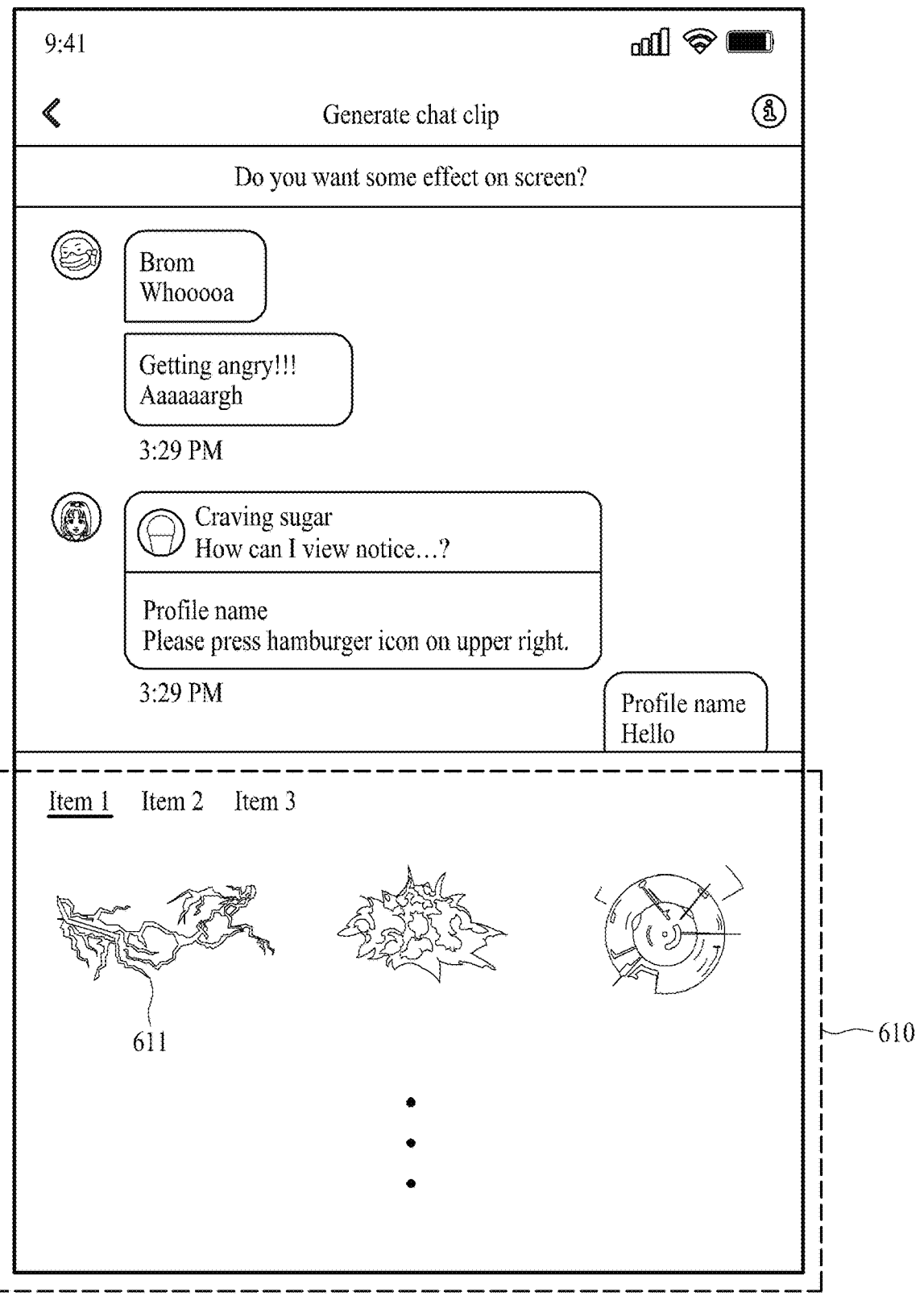
FIGS. 6A and 6B are diagrams each illustrating an example interface screen on which a function of setting a special effect for a certain scroll position is executed, which is output to a terminal for executing the instant messenger.
Figure 6B:
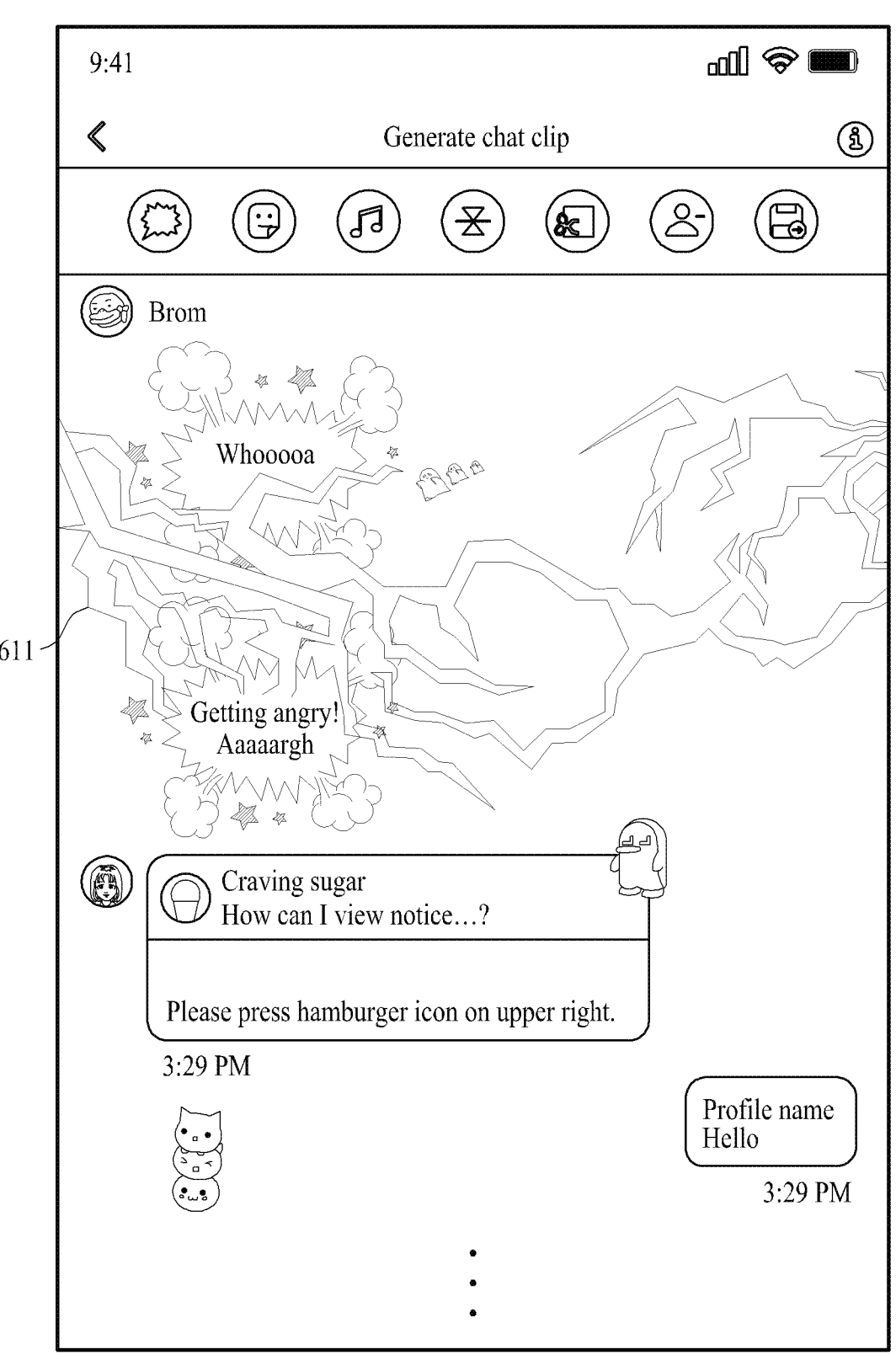

FIGS. 6A and 6B are diagrams each illustrating an interface screen on which a function of setting a special effect for a certain scroll position is executed, which is output to a terminal for executing the instant messenger.

A chat clip modification function, such as a special effect setting function, may include the function of setting a special effect for a certain scroll position. For example, the function of setting a special effect for a certain scroll position may be executed by an input of setting a third interfacing object of the tool 340 of FIG. 3D for generating a chat clip.

Referring to a screen 601 of FIG. 6A, when executing the function of setting a special effect for a certain scroll position, an interface for setting the special effect for the certain scroll position may be provided. A special effect list 610 set for the certain scroll position may be provided through the interface. A special effect (e.g., a special effect 611) to be set for the certain scroll position may be selected from the special effect list 610. The selected special effect 611 may be set for the certain scroll position. In an example, a selected special effect may be set for a scroll position at the time when the special effect is selected.

In an example, referring to a screen 602 of FIG. 6B, if a scroll position of a terminal for viewing a chat clip is at a scroll position for which a special effect 611 is set, the special effect 611 corresponding to the scroll position may be output.

Figure 7:
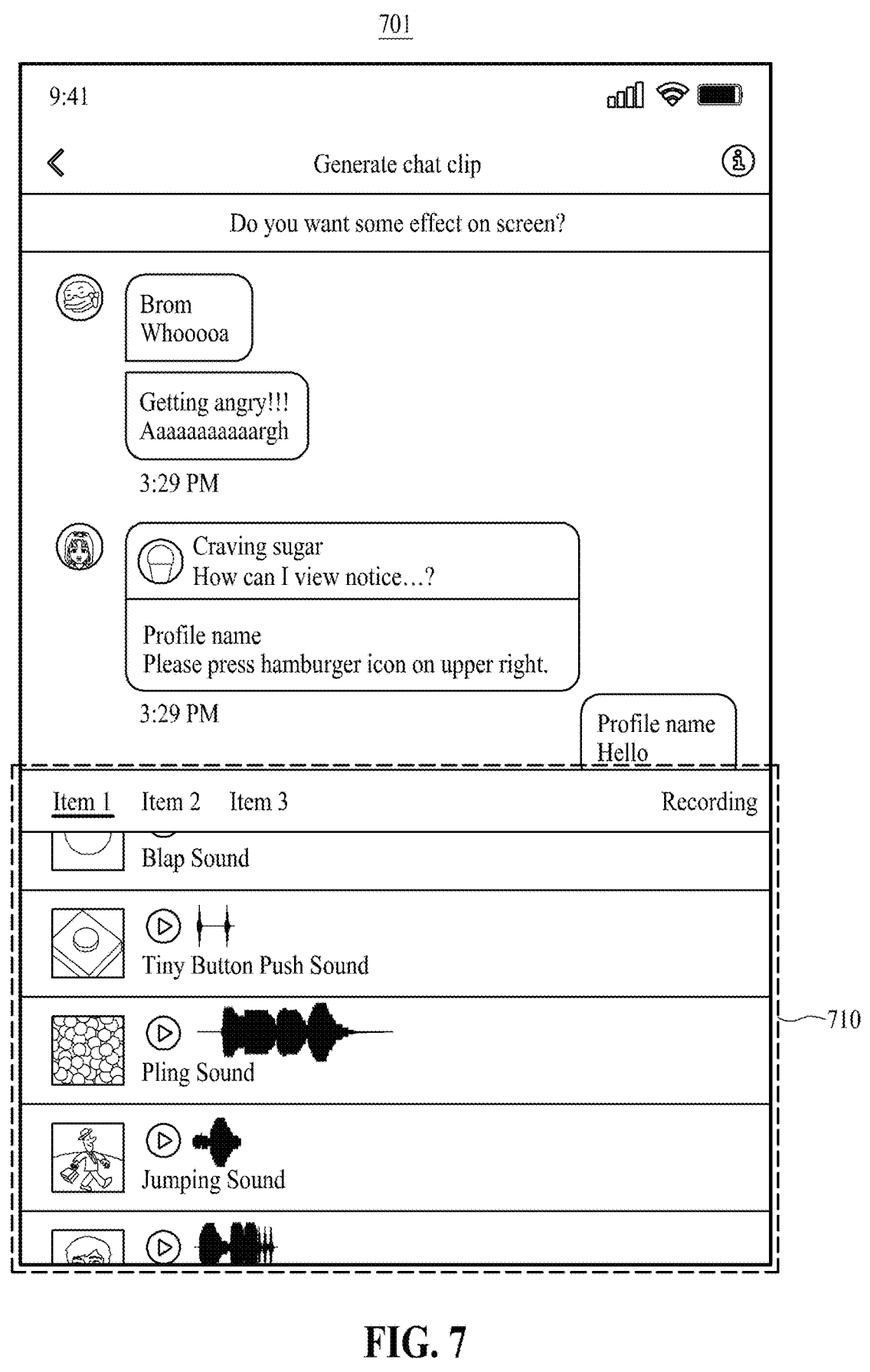

FIG. 7 is a diagram illustrating an interface screen on which a function of setting an auditory effect is executed, which is output to a terminal for executing the instant messenger.

A chat clip modification function, such as a special effect setting function, may include the function of setting an auditory effect. Special effects may include auditory effects other than visual effects. For example, the function of setting an auditory effect may be executed by an input of selecting a fourth interfacing object of the tool 340 of FIG. 3D for generating a chat clip.

Referring to a screen 701 of FIG. 7, when executing the function of setting an auditory effect, an interface for setting the auditory effect may be provided. An auditory effect list 710 may be provided through the interface. An auditory effect to be set for a chat section may be selected from the auditory effect list 710. In an example, a selected auditory effect may be set for the background music of a chat clip. When the chat clip is output, the auditory effect selected as the background music may be output. In an example, a selected auditory effect may be set for a certain chat message. If the certain chat message is selected or is output on a screen, the auditory effect may be output. In an example, a selected auditory effect may be set for a certain scroll position. The selected auditory effect may be set for a scroll position at the time when the auditory effect is selected. If a scroll position of a terminal for viewing a chat clip is at the scroll position for which the auditory effect is set, the auditory effect corresponding to the scroll position may be output.

Figure 8A:
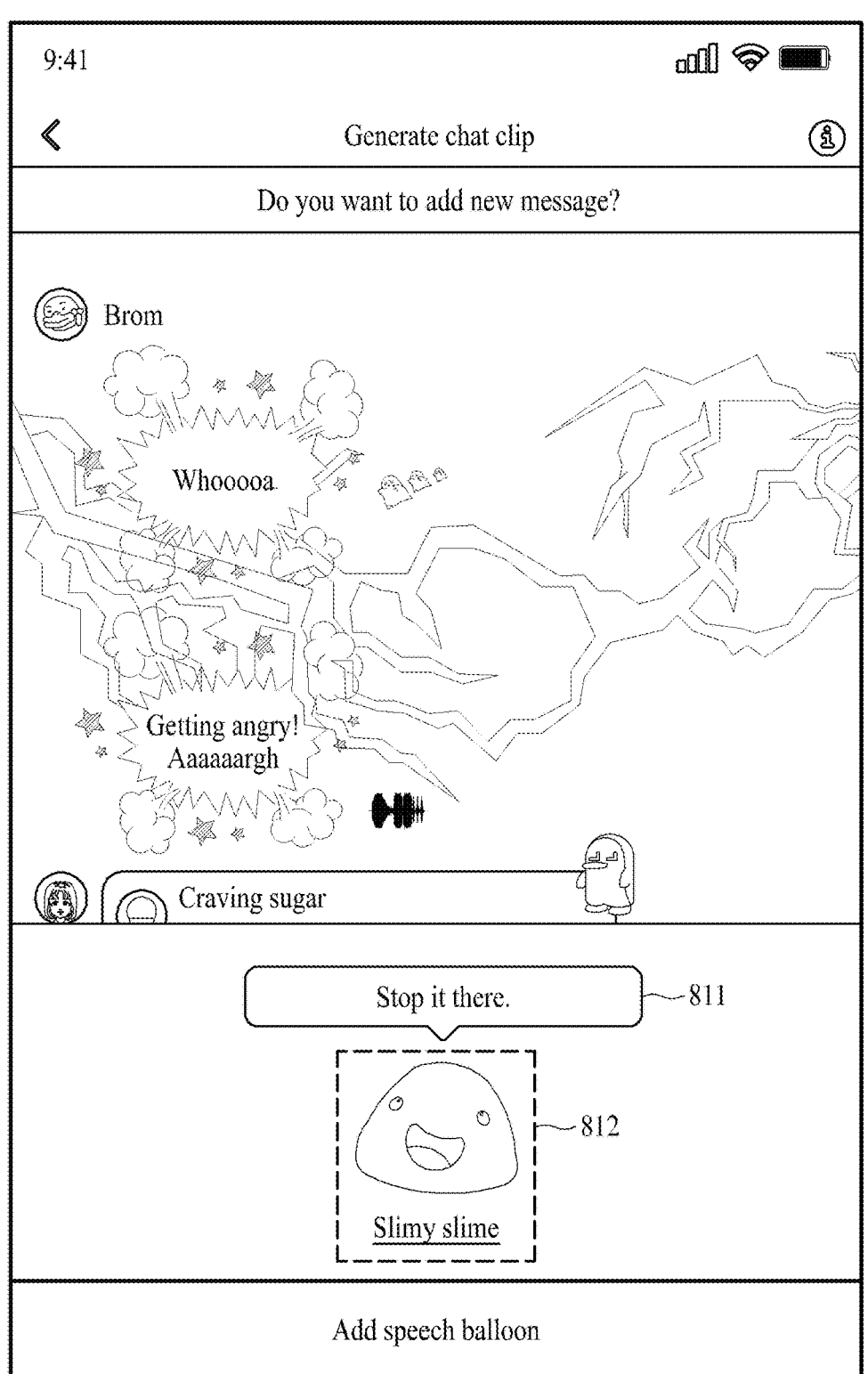
FIGS. 8A and 8B are diagrams each illustrating an example interface screen on which a chat message insertion function is executed, which is output to a terminal for executing the instant messenger.
Figure 8B:
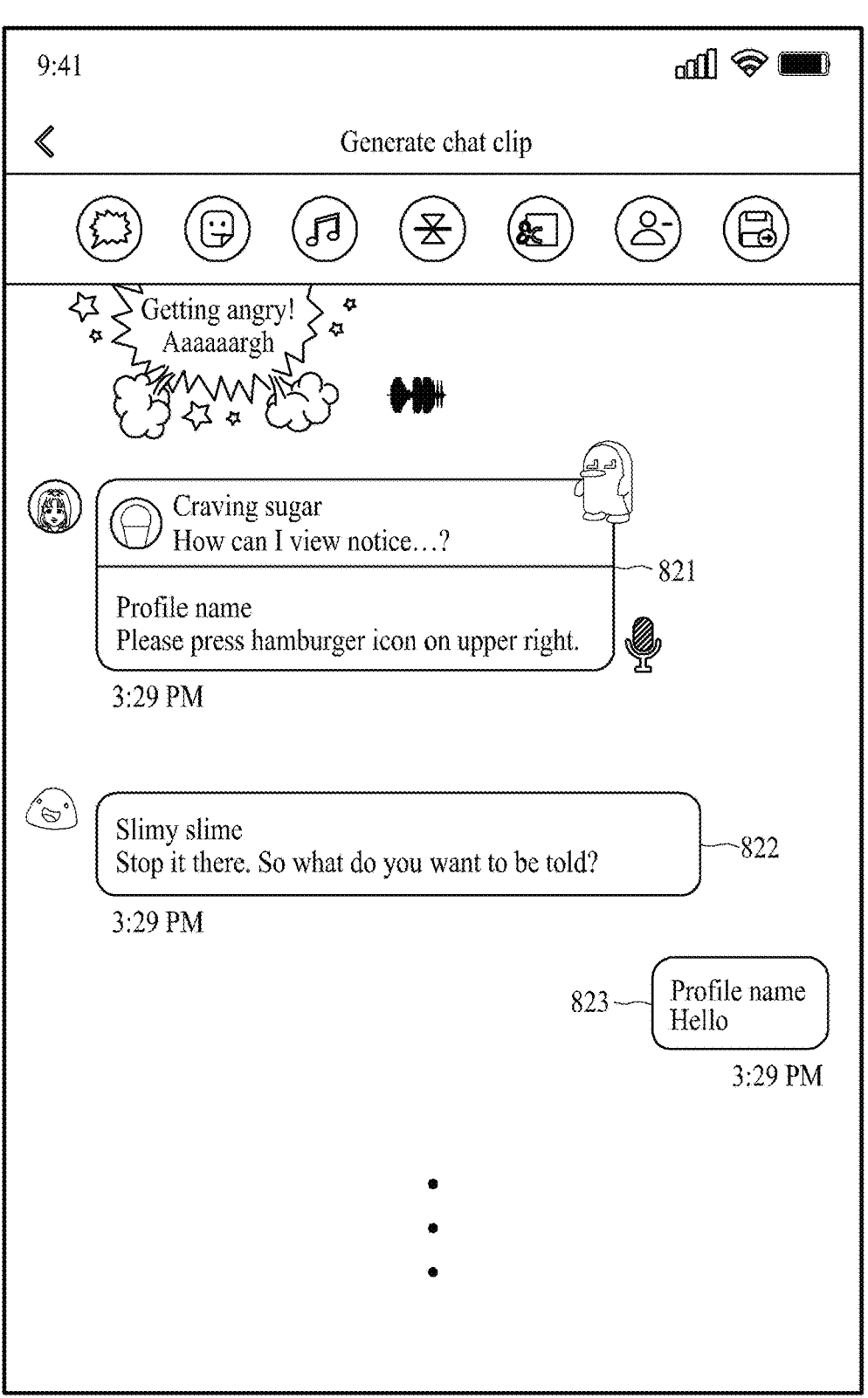

FIGS. 8A and 8B are diagrams each illustrating an interface screen on which a chat message insertion function is executed, which is output to a terminal for executing the instant messenger.

If a chat section for generating a chat clip is determined, a function of editing the chat section may be executed. A chat section edit function may include the function of editing a chat message. In an example, the chat message edit function may be executed by an input of changing a chat flow of a chat section of a user. When executing the chat message edit function, an interface for editing a chat message may be provided.

The chat message edit function may include a function of inserting a chat message. For example, the chat message insertion function may be executed by an input of selecting a fifth interfacing object included in the tool 340 of FIG. 3D for generating a chat clip.

Referring to a screen 801 of FIG. 8A, when executing the chat message insertion function, an interface for inserting a chat message may be provided. A phrase 811 of a chat message to be inserted through the interface may be input, and a sender account 812 of the chat message to be inserted may be set. The sender account 812 of the chat message may be a randomly generated account. In an example, a name and/or profile photo of the sender account 812 may be determined randomly or by an input of the user. A position into which the generated chat message is to be inserted may be set through the interface. In an example, the generated chat message may be inserted between a first chat message and a second chat message.

Referring to a screen 802 of FIG. 8B, a newly generated chat message 822 may be inserted into a certain position in a chat section. In an example, the newly generated chat message 822 may be inserted between a first chat message 821 and a second chat message 823. The newly generated chat message 822 may be displayed such that the newly generated chat message 822 is distinguished from chat messages (e.g., the first and second chat messages 821 and 823) already included in the chat section. In an example, the chat message 822 may be displayed as a message sent by a randomly generated sender account. In an example, the inserted chat message 822 may be displayed with a speech balloon of which the form (e.g., the shape or color of the speech balloon, etc.) is different from that of the chat messages (e.g., the first and second chat messages 821 and 823) already included in the chat section.

FIGS. 9A and 9B are diagrams each illustrating an interface screen on which a chat message deletion function is executed, which is output to a terminal for executing the instant messenger.

A chat message edit function may include the chat message deletion function. For example, the chat message deletion function may be executed by an input of selecting a sixth interfacing object included in the tool 340 of FIG. 3D for generating a chat clip.

Referring to a screen 901 of FIG. 9A, when executing the chat message deletion function, an interface for deleting a chat message may be provided. In an example, a chat message to be deleted may be selected through the interface by an input of selecting interfacing objects 911 and 912, for deletion, corresponding respectively to chat messages. A chat message selected as the chat message to be deleted may be deleted from the chat section. A chat clip may be generated based on the chat section excluding the deleted chat message. A chat message sent by a certain user account selected from the chat section may be deleted. Referring to a screen 902 of FIG. 9B, when executing the chat message deletion function, an interface for deleting the chat message sent by the certain user account may be provided. User accounts participating in a chatroom or a list 920 of user accounts transmitting chat messages included in a chat section may be provided through the interface. In an example, a user account may be selected through the interface by an input of selecting interfacing objects 921 and 922, for deletion, corresponding respectively to user accounts. A chat message sent by a user account selected from the list 920 of user accounts may be deleted from the chat section.

Figure 10:
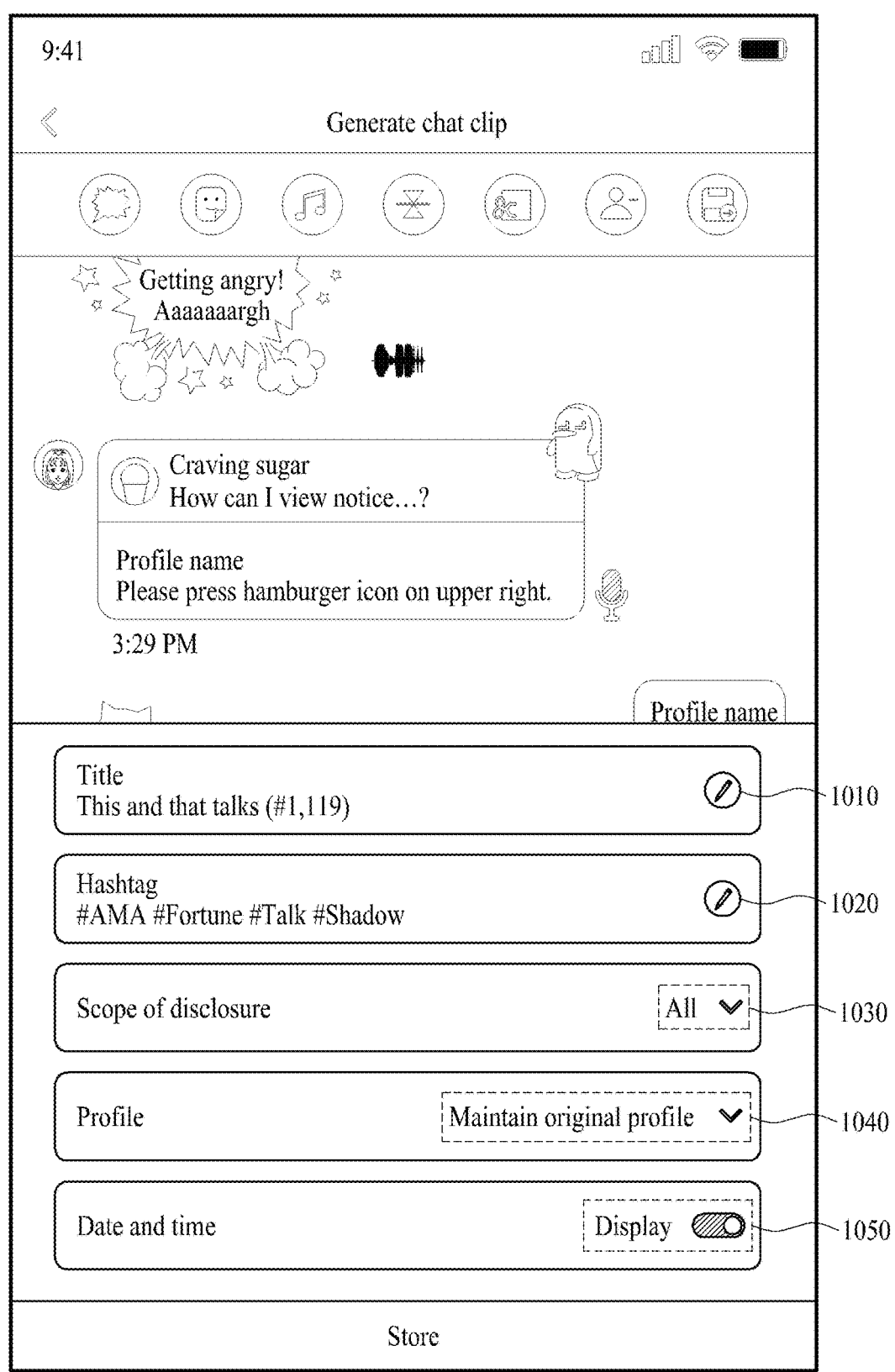
FIG. 10 is a diagram illustrating an example interface screen for setting other information on a chat clip.

FIG. 10 is a diagram illustrating an interface screen for setting other information on a chat clip.

Referring to a screen 1001 of FIG. 10, an interface for setting other information on a chat clip may be provided. In an example, other information which may be set for a chat clip may include the title information of the chat clip. A phrase to be set as a title of the chat clip may be input by an input of selecting an interfacing object 1010. The input phrase may be set as the title of the chat clip.

In an example, the other information that may be set for the chat clip may include a hashtag. The hashtag to be set to the chat clip may be input by an input of selecting an interfacing object 1020. The input hashtag may be added to the chat clip. The hashtag may be used to search for the chat clip. For example, when a certain hashtag is input as a search word, a chat clip including the hashtag may be provided as a search result.

In an example, the other information which may be set for the chat clip may include a condition for the scope of disclosure associated with the chatroom and/or the chat clip. The condition for the scope of disclosure for the chat clip may be input by an input of selecting an interfacing object 1030. The condition for the scope of disclosure may be the scope of accounts to which the disclosure of the chat clip is allowed and may include, for example, at least one of a condition for disclosure to an account in a friend relationship, a condition for disclosure to an account belonging to a certain group, a condition for disclosure to all accounts, and a condition for disclosure to an account inputting a password.

In an example, the other information which may be set for the chat clip may include the condition for the scope of disclosing the user account transmitting the chat message. The condition for the scope of disclosing the profile of the user account transmitting the chat message included in the chat clip may be input by an input of selecting an interfacing object 1040. The condition of whether to disclose the profile of the user account may be set by the user account requesting the generation of the chat clip or the user account transmitting the chat message.

In an example, the other information which may be set for the chat clip may include the condition of whether to display time information on when the chat message is transmitted. The condition of whether to display the time information on when the chat message is transmitted may be input by an input of selecting an interfacing object 1050.

Figure 11A:
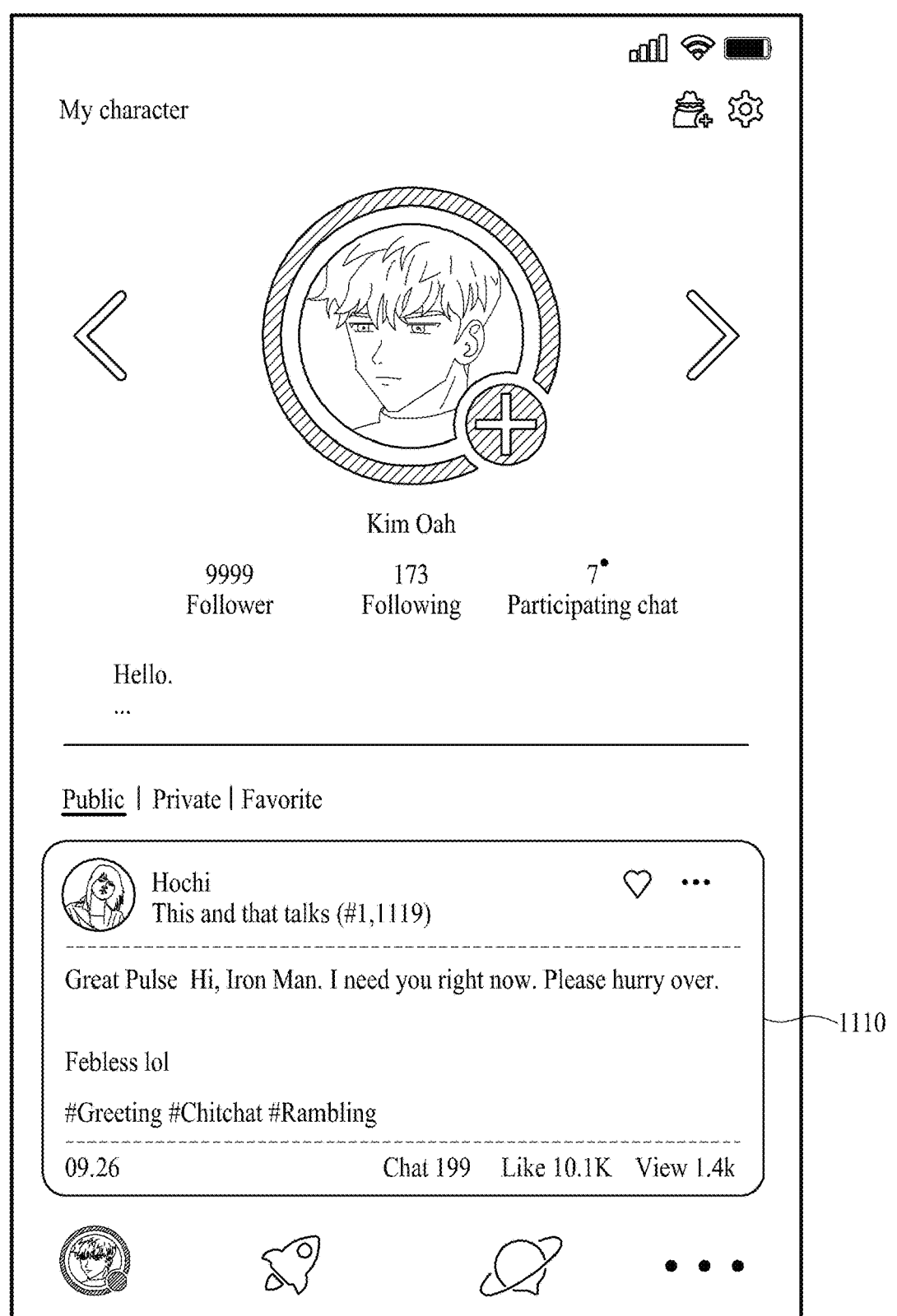
FIGS. 11A and 11B are diagrams each illustrating an example profile page output to a terminal for executing the instant messenger.
Figure 11B:
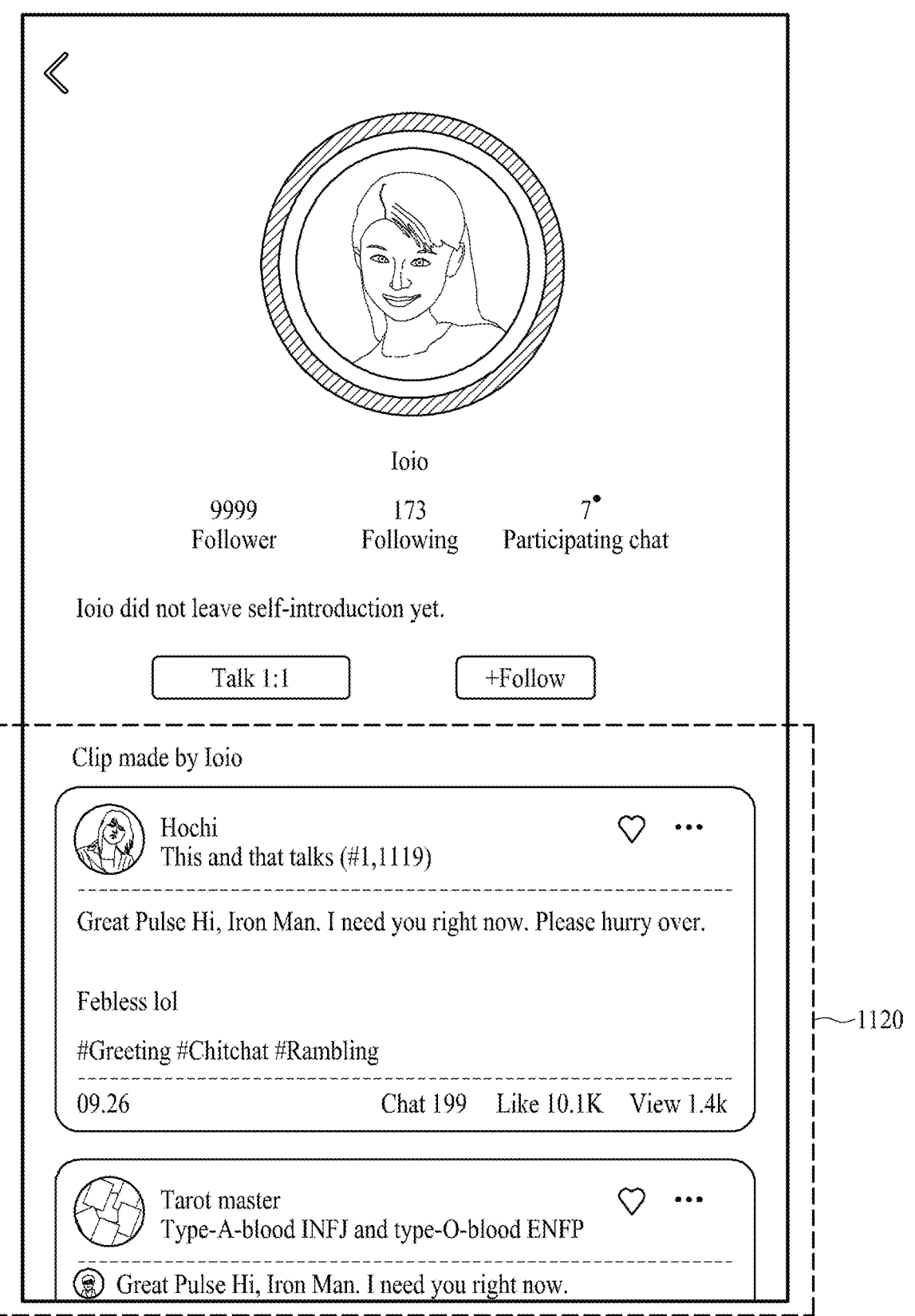

FIGS. 11A and 11B are diagrams each illustrating a profile page output to a terminal for executing the instant messenger.

A chat clip may be posted to a profile page of a user account. The profile page of the user account may be a page providing information on the user account.

FIG. 11A is a diagram illustrating a profile page screen 1101 of a user account logging in to the terminal. Referring to the profile page screen 1101, a chat clip 1110 generated by the user account may be posted through a profile page. The profile page may include a list of chat clips set to be disclosed to other users, a list of chat clips set not to be disclosed to the other users, and a list of chat clips set as favorites.

In an example, the lists of chat clips provided through the profile page may include chat clips clipped by the user account, other than the chat clips generated by the user account. The user account may clip chat clips generated by other user accounts and may post the clipped chat clips to the profile page of the user account.

Information on the user account may be provided through the profile page, other than the lists of chat clips. For example, the information on the user account may provide the information (e.g., the number of followers or the number of followings) of other user accounts in a certain relationship with the user account and information (e.g., the number of chatrooms which the user account participates in) on a chatroom which the user account participates in.

FIG. 11B is a diagram illustrating a profile page screen 1102 of another user account. A user may view a profile page of the other user account through the terminal. Referring to the profile page screen 1102, a list 1120 of chat clips generated by the other user account may be provided through the profile page of the other user account. The user may view chat clips included in the chat clip list 1120 through the terminal.

The information, including the number of followers, the number of followings, and the number of chatrooms in which the other user account participates, on the other user account may be provided through the profile page of the other user account.

The following of the other user account may be requested through the profile page of the other user account. A chat with the other user account may be requested through the profile page of the other user account.

Figure 12B:
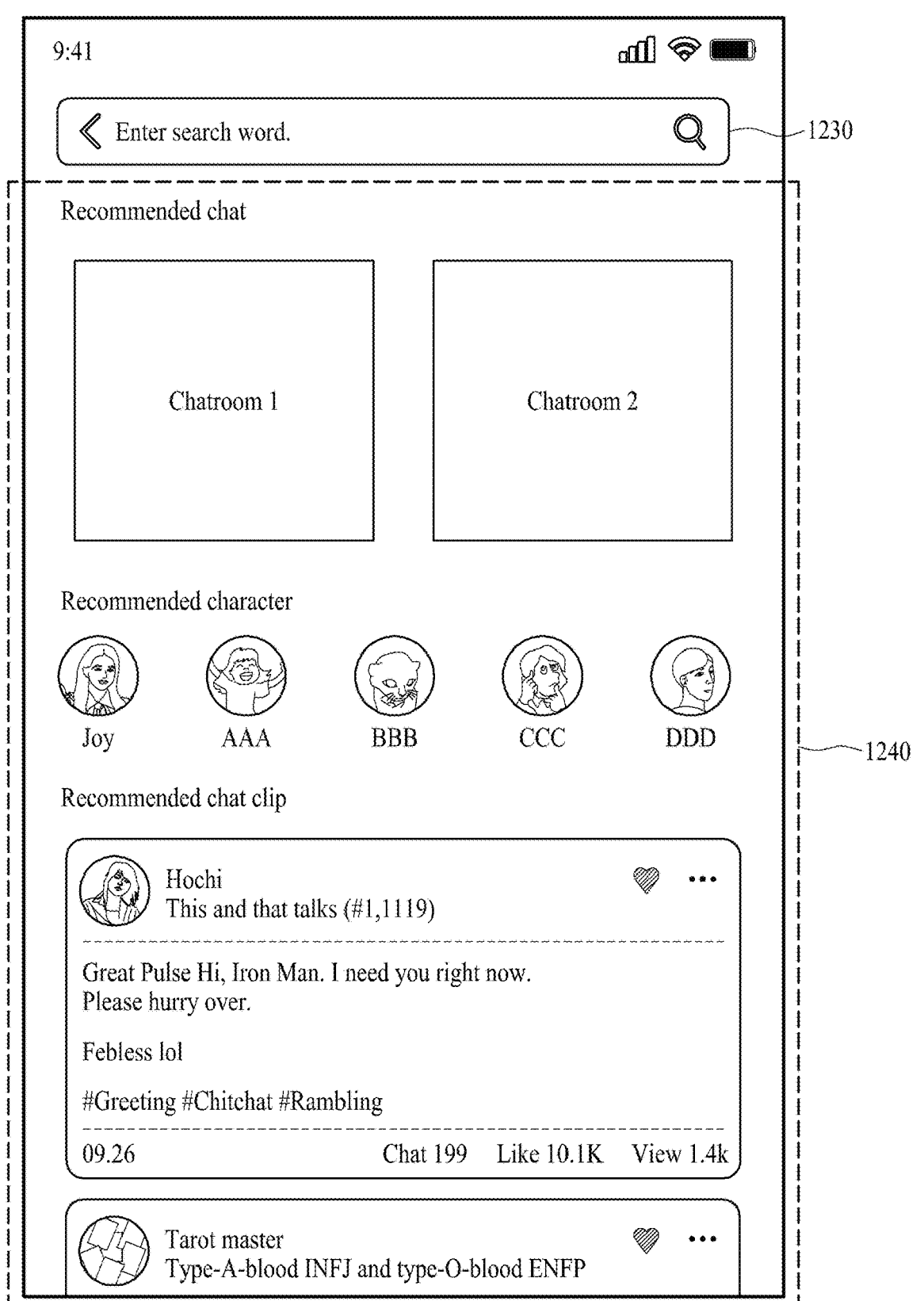

FIGS. 12A to 12C are diagrams each illustrating an interface for providing a chat clip list output to a terminal for executing the instant messenger.

Referring to a screen 1201 of FIG. 12A, a chat clip list 1210 may be provided to the terminal for executing the instant messenger. The chat clip list 1210 may include any number of chat clip items. Each of the chat clip items may correspond to any one of a plurality of chat clip(s) generated by user accounts subscribing to a service. In an example, a chat clip list may include randomly selected n chat clip items. In an example, the chat clip list may include chat clip items related to a user of the terminal. The user of the terminal may refer to a user of a user account logging in to the instant messenger executed in the terminal. The chat clip items related to the user may include chat clip items determined to be highly relevant to information (e.g., age, gender, residence, occupation, hobby, field of interest, etc.) registered in the user account, chat clip items similar to chat clips set as a target of interest or favorite by the user, or the like.

A chat clip item may include an indicator 1211 of a date of generation of a chat clip and an indicator 1212 of the number of chat messages included in the chat clip.

A chat clip item may include feedback information on a chat clip. In an example, the feedback information may include an indicator 1214 of views of a chat clip and an indicator 1213 of the displayed number of 'likes' for the chat clip.

The feedback on a chat clip item included in a chat clip list may be transmitted. The chat clip item may include an interfacing object for receiving feedback information. For example, 'likes' for the chat clip may be displayed by an input of selecting an interfacing object 1215. If the interfacing object 1215 is selected, the displayed number of 'likes' for the chat clip may increase. The indicator 1213 of the displayed number of 'likes' for the chat clip may be updated according to the increase of the displayed number of 'likes'. For example, the viewing of the chat clip may be requested through the chat clip item. If the chat clip item is viewed, the views of the chat clip may increase. The indicator 1214 of views may be updated according to the increase of views.

An interface providing the chat clip list 1210 may provide the function of searching for a chat clip. In an example, the function of searching for a chat clip may be executed by an input of selecting an interfacing object 1220. If the search function is executed, a search interface may be provided as shown in a screen 1202 of FIG. 12B.

Referring to the screen 1202 of FIG. 12B, the search interface may include a search box 1230 into which a search word is input. The search interface may include a search result window 1240 showing a search result. A recommendation list may be displayed on the search result window 1240 before the search for the input search word is performed. The recommendation list may include a recommended chatroom list, recommended profile list, and recommended chat clip list related to the user. If the search for the search word input to the search box 1230 is performed, a chat clip list corresponding to the search word may be displayed on the search result window 1240. The chat clip list corresponding to the search word may include chat clip(s) including the input search word or a word similar to the search word as a title or chat clip(s) including chat messages including the input search word or a word similar to the search word.

The search function may include a hashtag search function. Referring to a screen 1203 of FIG. 12C, a hashtag may be input as a search word, and a chat clip including the input hashtag may be provided as a search result.

Figure 13A:
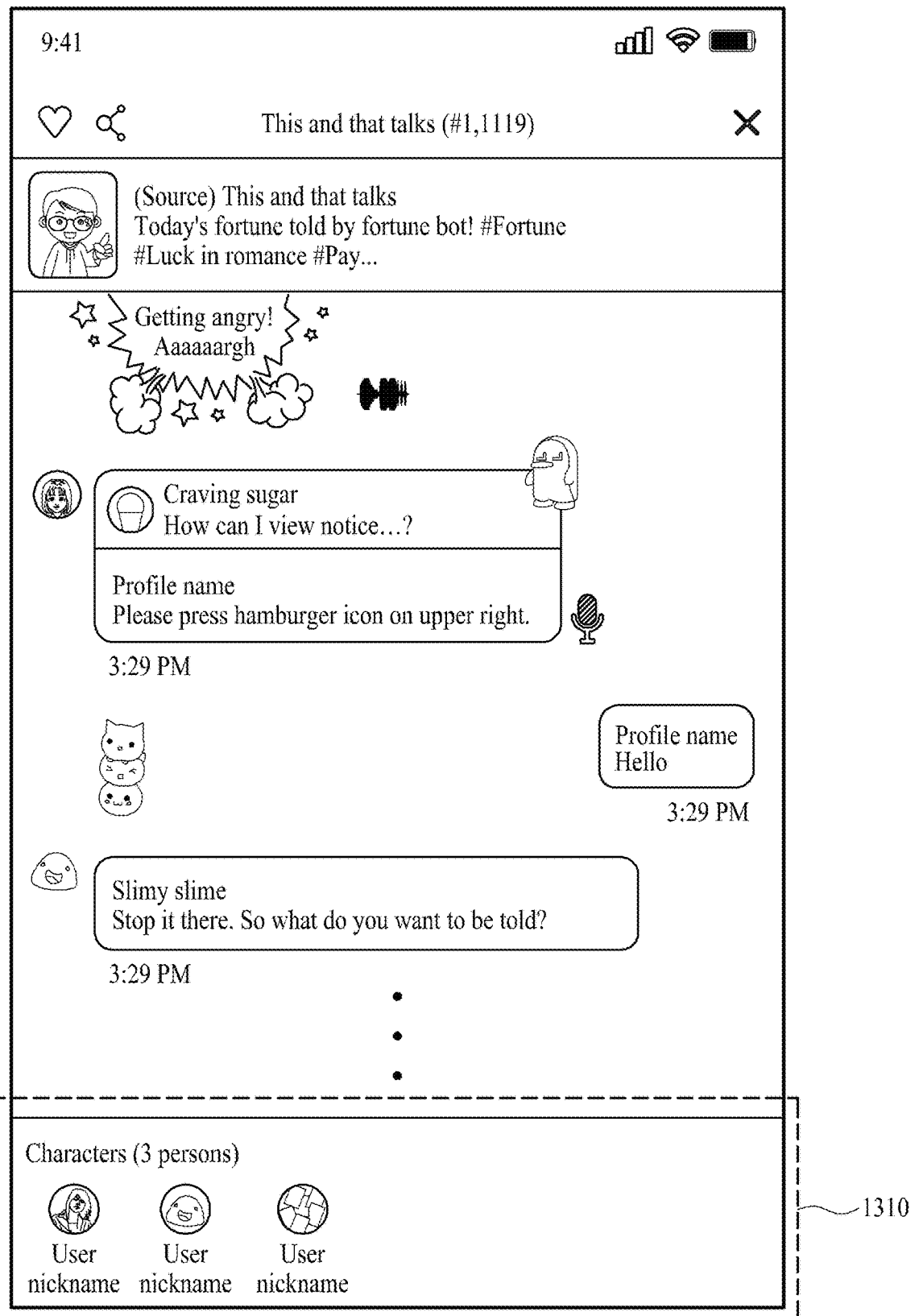

FIGS. 13A and 13B are diagrams illustrating a screen output to a terminal for viewing a chat clip.

Referring to a screen 1301 of FIG. 13A, a chat clip may be output in the terminal for viewing a chat clip. A chat clip may include a chat message. The chat clip may be output according to a set output method. For example, an icon set to be displayed at a certain position may be output. For example, the chat message may be output in a set form of a speech balloon. For example, an auditory effect set for the chat clip may be output through a speaker. For example, a special effect set for a scroll position of the terminal may be output depending on the scroll position of the terminal.

A profile list 1310 of a user account transmitting a chat message included in a chat clip may be provided through a view screen 1301 of the chat clip.

Referring to a screen 1302 of FIG. 13B, a chat clip related to a chat clip may be requested through a view screen 1302 of the chat clip. In an example, a chat clip list related to a viewed chat clip may be provided by an input of selecting an interfacing object 1320. The related chat clip list may include one or more other chat clips having a title similar to that of the viewed chat clip, having a set hashtag similar to that of the viewed chat clip, or having a participating user account similar to that of the viewed chat clip. Related chat clips may include chat clips that another user viewing the chat clip searches for or views.

An operating method of the instant messenger may be performed in a device in which the instant messenger is executed. The device may include a processor, a memory, and an input/output device (e.g., a touchscreen display, buttons, voice input/output interfaces, image recognition devices, such as cameras, etc.). The device may include, for example, a smartphone, a personal computer (PC), a tablet PC, or the like.

The processor may perform at least one operation included in the operating method of the instant messenger described above with reference to FIGS. 1 to 13B. For example, the processor may perform the operating method of the instant messenger for generating a chat clip including receiving the selection of a chat section including a chat message that is transmitted and received in the chatroom described with reference to FIG. 1, editing the chat section based on at least one change input among a chat flow of the chat section and an output method of the chat section, and generating a chat clip by tagging information on the chatroom in the edited chat section. The processor may perform the operating method of the instant messenger for viewing a chat clip including receiving a view request for the chat clip, providing a chat message included in the chat clip in an output method set for the chat clip, and updating feedback information on the chat clip.

The memory may store information related to the operating method of the instant messenger or information necessary for performing the operating method of the instant messenger. The memory may be a volatile memory or a non-volatile memory.

According to one or more aspects of the present disclosure, the device may be connected to an external device (e.g., a PC or a network) through the input/output device and may exchange data therewith. For example, the device may receive an input of a user through the input/output device and may output data according to an operation of the instant messenger.

The memory may store a program implementing the operating method of the instant messenger described above. The processor may execute the program stored in the memory and may control the device. The code of the program executed by the processor may be stored in the memory.

According to one or more aspects, there is provided an operating method of an instant messenger for generating a chat clip including determining a chat section including a chat message that is transmitted and received in a chatroom; editing the chat section based on at least one change input among a chat flow of the determined chat section and an output method of the determined chat section; and generating a chat clip that tags information on the chatroom, based on an editing result of the chat section.

The editing the chat section may include setting a special effect corresponding to the chat section, based on a change input of the output method of the chat section.

The setting the special effect may include setting the special effect to a background of the chat section; setting the special effect to a certain chat message included in the chat section; and setting the special effect to a certain scroll position of a page corresponding to the chat section.

The editing the chat section may further include inserting a chat message into the chat section, based on a change input of the chat flow of the chat section, and deleting a chat message from the chat section, based on a change input of the chat flow of the chat section.

The inserting the chat message may include inserting a new chat message that is different from a chat message already included in the chat section.

The deleting the chat message may include deleting a certain chat message selected from a chat message included in the chat section and deleting a chat message that is transmitted by a certain user account selected from a chat message included in the chat section.

The operating method may further include storing the generated chat clip corresponding to a user account requesting the generation of the chat clip.

The operating method may further include posting the generated chat clip to a profile page of a user account.

The operating method may further include at least one of transmitting the chat clip through the chatroom, based on a sharing request for the chat clip, and generating a link for posting the chat clip on an external web page, based on the sharing request for the chat clip.

The generating the chat clip may further include at least one of adding hashtag information to the chat clip; setting a condition for the scope of disclosure for the chat clip; and setting a condition of whether to disclose a profile of a user account transmitting a chat message included in the chat clip.

According to an aspect, there is provided an operating method of an instant messenger for viewing a chat clip including receiving a view request for the chat clip; providing a chat message included in the chat clip in an output method set for the chat clip; and updating feedback information on the chat clip.

The providing the chat message may include outputting a special effect set for the chat clip.

The operating method may further include providing a link to a chatroom tagged by the chat clip.

The updating the feedback information may include at least one of updating the number of views based on a view request for the chat clip and updating the feedback information on reaction to the chat clip, based on a reaction input for the chat clip.

According to an aspect, there is provided an apparatus for executing an instant messenger including a processor configured to determine a chat section including a chat message that is transmitted and received in a chatroom, edit the chat section based on at least one change input among a chat flow of the determined chat section and an output method of the determined chat section, and generate a chat clip that tags information on the chatroom, based on an editing result of the chat section.

When editing the chat section, the processor may set a special effect corresponding to the chat section, based on a change input of the output method of the chat section.

When setting the special effect, the processor may set the special effect to a background of the chat section, may set the special effect to a certain chat message included in the chat section, and may set the special effect to a certain scroll position of a page corresponding to the chat section.

When editing the chat section, the processor may insert a chat message into the chat section, based on a change input of the chat flow of the chat section, and may delete a chat message from the chat section, based on a change input of the chat flow of the chat section. According to an aspect, there is provided an apparatus for executing an instant messenger including a processor configured to receive a view request for a chat clip, provide a chat message included in the chat clip in an output method set for the chat clip, and update feedback information on the chat clip.

The examples described herein may be implemented by using a hardware component, a software component, and/or a combination thereof. A processing device may be implemented using one or more general-purpose or special-purpose computers, such as, for example, a processor, a controller and an arithmetic logic unit (ALU), a digital signal processor (DSP), a microcomputer, a field-programmable gate array (FPGA), a programmable logic unit (PLU), a microprocessor, or any other device capable of responding to and executing instructions in a defined manner. The processing device may run an operating system (OS) and one or more software applications that run on the OS. The processing unit also may access, store, manipulate, process, and generate data in response to execution of the software. For the purpose of simplicity, the description of a processing unit is used as singular; however, one skilled in the art will appreciate that a processing unit may include multiple processing elements and multiple types of processing elements. For example, the processing unit may include a plurality of processors, or a single processor and a single controller. In addition, different processing configurations are possible, such as parallel processors.

The software may include a computer program, a piece of code, an instruction, or some combination thereof, to independently or uniformly instruct and/or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods, operations, and/or algorithms according to the above-described examples may be recorded in non-transitory computer-readable media including program instructions to implement various operations described herein. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs and/or DVDs; magneto-optical media such as optical discs; and hardware devices that are specially configured to store and perform program instructions, such as read-only memory (ROM), random-access memory (RAM), flash memory, and the like. Examples of program instructions include both machine code, such as produced by a compiler, and files containing higher-level code that may be executed by the computer using an interpreter.

The above-described devices may act as one or more software modules in order to perform the operations of the above-described examples, or vice versa.

As described above, although the examples have been described with reference to the illustrative drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An apparatus configured to modify a selected chat section of an instant messenger application, the apparatus comprising:
    a display configured to receive at least one user input;
    a communication interface;
    one or more processors; and
    memory storing instructions that, when executed by the one or more processors, cause the apparatus to:
        display, in a user interface of an instant messenger application executing on the apparatus, a chatroom comprising a plurality of different chat messages previously transmitted between a plurality of different users;
        receive, via the user interface, a first user input indicating a user selection of a chat section comprising two or more chat messages of the plurality of different chat messages;
        receive, via the user interface, a second user input comprising an indication of one or more modifications to the chat section, wherein the one or more modifications to the chat section comprise a modification to an output method of each of the two or more chat messages by causing display of one or more graphical elements in conjunction with the two or more chat messages;
        generate a chat clip by generating, based on the modification to the output method of each of the two or more chat messages, a modified version of the chat section, wherein the chat clip is distributable, independent from the chatroom, via an electronic medium and is configured to be displayed in a second user interface outside of the chatroom, and wherein the chat clip, when displayed in the second user interface outside of the chatroom, is configured to show;
            the two or more chat messages,
            the one or more graphical elements in conjunction with the two or more chat messages, and, and
            one or more user interface elements that, when selected, permit access to the chatroom;
        distribute the chat clip via the electronic medium; and
        cause a second computing device, having accessed the electronic medium, to display the chat clip by causing display of each of the two or more chat messages based on the modification to the output method of each of the two or more chat messages.

2. The apparatus of claim 1, wherein the modification to the output method comprises an indication of a special effect for the two or more chat messages in the chat section, and wherein the instructions, when executed by the one or more processors, cause the apparatus to display the chat clip by causing the apparatus to display the special effect during display, by the apparatus, of the chat section.

3. The apparatus of claim 2, wherein the special effect comprises one or more of:
    a modification to a background of the chat section,
    a modification to text content of at least one of the two or more chat messages, or
    output of an effect when the instant messenger application displays a certain scroll position corresponding to the chat section.

4. The apparatus of claim 1, wherein the one or more modifications to the chat section further comprise a modification to a chat flow of the chat section, and wherein the instructions, when executed by the one or more processors, cause the apparatus to generate the chat clip by causing the apparatus to:
    insert a first chat message into the chat section, or
    delete a second chat message from the chat section.

5. The apparatus of claim 4, wherein the instructions, when executed by the one or more processors, cause the apparatus to delete the second chat message by one or more of:
    deleting a user-selected chat message of the two or more chat messages of the chat section; or
    deleting the second chat message based on a determination that it was transmitted by an instant messenger application associated with a certain user account.

6. The apparatus of claim 1, wherein the instructions, when executed by the one or more processors, cause the apparatus to:
    store, in a memory, the chat clip, wherein the stored chat clip is associated with a user that provided the second user input.

7. The apparatus of claim 1, wherein the instructions, when executed by the one or more processors, cause the apparatus to:
    cause display, in a user interface that displays a profile page of a user account, of the chat clip.

8. The apparatus of claim 1, wherein the instructions, when executed by the one or more processors, cause the apparatus to at least one of:
    transmit the chat clip via the chatroom; or
    generate a link configured to, upon access, enable posting of the chat clip on an external web page.

9. The apparatus of claim 1, wherein the instructions, when executed by the one or more processors, cause the apparatus to generate the chat clip by one or more of:
    adding hashtag information to the chat clip;
    setting a condition for a scope of disclosure for the chat clip; or
    setting a condition of whether to disclose a profile of a user account transmitting a chat message comprised in the chat clip,
    wherein the one or more user interface elements, when selected, cause access to a start position of the two or more chat messages.

10. A method for modifying a selected chat section of an instant messenger application, the method comprising:
    displaying, in a user interface of an instant messenger application executing on a first computing device, a chatroom comprising a plurality of different chat messages previously transmitted between a plurality of different users;

receiving, via the user interface, a first user input indicating a user selection of a chat section comprising two or more chat messages of the plurality of different chat messages;

receiving, via the user interface, a second user input comprising an indication of one or more modifications to the chat section, wherein the one or more modifications to the chat section comprise a modification to an output method of each of the two or more chat messages by causing display of one or more graphical elements in conjunction with the two or more chat messages;

generating a chat clip by generating, based on the modification to the output method of each of the two or more chat messages, a modified version of the chat section, wherein the chat clip is distributable, independent from the chatroom, via an electronic medium and is configured to be displayed in a second user interface outside of the chatroom, and wherein the chat clip, when displayed in the second user interface outside of the chatroom, is configured to show;

the two or more chat messages, the one or more graphical elements in conjunction with the two or more chat messages, and, and one or more user interface elements that, when selected, permit access to the chatroom;

distributing the chat clip via the electronic medium; and causing a second computing device, having accessed the electronic medium, to display the chat clip by causing display of each of the two or more chat messages based on the modification to the output method of each of the two or more chat messages.

11. The method of claim 10, wherein the modification to the output method comprises an indication of a special effect for the two or more chat messages in the chat section, and wherein the displaying the chat clip comprises:

displaying the special effect during display, by the first computing device, of the chat section.

12. The method of claim 11, wherein the special effect comprises one or more of:

a modification to a background of the chat section;

a modification to text content of at least one of the two or more chat messages; or output of an effect when the instant messenger application displays a certain scroll position corresponding to the chat section.

13. The method of claim 10, wherein the one or more modifications to the chat section further comprise a modification to a chat flow of the chat section, and wherein the generating the chat clip comprises one or more of:

inserting a first chat message into the chat section; or deleting a second chat message from the chat section.

14. The method of claim 13, wherein the inserting the first chat message comprises:

inserting a new chat message that is different from any of the chat messages in the chat section.

15. The method of claim 13, wherein the deleting the second chat message comprises one or more of:

deleting a user-selected chat message of the two or more chat messages of the chat section; or deleting the second chat message based on a determination that it was transmitted by an instant messenger application associated with a certain user account.

16. The method of claim 10, further comprising:

storing, in a memory, the chat clip, wherein the stored chat clip is associated with a user that provided the second user input.

17. The method of claim 10, further comprising:

causing display, in a user interface that displays a profile page of a user account, of the chat clip.

18. The method of claim 10, further comprising at least one of:

transmitting the chat clip via the chatroom; or generating a link configured to, upon access, enable posting of the chat clip on an external web page.

19. The method of claim 10, wherein the generating the chat clip further comprises one or more of:

adding hashtag information to the chat clip;

setting a condition for a scope of disclosure for the chat clip; or setting a condition of whether to disclose a profile of a user account transmitting a chat message comprised in the chat clip.

20. A non-transitory computer-readable storage medium storing instructions that, when executed by a processor, cause the processor to perform the method of claim 10.

* * * * *